(12) United States Patent
Kim et al.

(10) Patent No.: US 8,806,339 B2
(45) Date of Patent: Aug. 12, 2014

(54) USER INTERFACE CONTROL FOR MEDIA EDITING APPLICATION

(75) Inventors: Hans H. Kim, Santa Monica, CA (US); Andrew Bryant, Los Gatos, CA (US); Adriana Dumitras, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/367,363

(22) Filed: Feb. 6, 2012

(65) Prior Publication Data
US 2013/0205208 A1   Aug. 8, 2013

(51) Int. Cl.
    *G06F 3/14*   (2006.01)
(52) U.S. Cl.
    USPC .................... 715/716; 715/833; 715/765
(58) Field of Classification Search
    None
    See application file for complete search history.

(56) References Cited

U.S. PATENT DOCUMENTS

| | | | |
|---|---|---|---|
| 5,903,264 A * | 5/1999 | Moeller et al. ................ | 715/719 |
| 6,348,936 B1 | 2/2002 | Berteig | |
| 6,362,829 B1 | 3/2002 | Omvik et al. | |
| 7,081,900 B2 * | 7/2006 | Gonsalves et al. ........... | 345/594 |
| 7,123,269 B1 | 10/2006 | Bourdey et al. | |
| 7,693,341 B2 | 4/2010 | Pettigrew et al. | |
| 7,769,810 B1 | 8/2010 | Kaufman | |
| 7,870,496 B1 * | 1/2011 | Sherwani ...................... | 715/761 |
| 7,978,938 B1 | 7/2011 | Wilensky | |
| 8,023,164 B2 | 9/2011 | Ogawa | |
| 8,260,940 B1 * | 9/2012 | Vosshall et al. .............. | 709/229 |
| 8,401,284 B2 | 3/2013 | Pettigrew et al. | |
| 8,468,465 B2 | 6/2013 | Warner et al. | |
| 2001/0036310 A1 | 11/2001 | Pettigrew et al. | |
| 2002/0002707 A1 * | 1/2002 | Ekel et al. ....................... | 725/87 |
| 2003/0035075 A1 * | 2/2003 | Butler et al. .................. | 348/734 |
| 2003/0103234 A1 | 6/2003 | Takabayashi et al. | |
| 2003/0164847 A1 * | 9/2003 | Zaima et al. .................. | 345/723 |
| 2003/0197710 A1 * | 10/2003 | Gonsalves et al. ............ | 345/600 |
| 2004/0119744 A1 * | 6/2004 | Chan ............................. | 345/763 |
| 2005/0034083 A1 * | 2/2005 | Jaeger .......................... | 715/863 |

(Continued)

FOREIGN PATENT DOCUMENTS

| | | |
|---|---|---|
| CA | 2806577 | 2/2012 |
| EP | 2603846 | 6/2013 |
| WO | WO 2009/146296 | 12/2009 |
| WO | WO 2012/021313 | 2/2012 |

OTHER PUBLICATIONS

Sony Tablet S (32GB) Review , Oct. 26, 2011, p. 4.*

(Continued)

*Primary Examiner* — Ryan Pitaro
*Assistant Examiner* — Mahelet Shiberou
(74) *Attorney, Agent, or Firm* — Adeli LLP

(57) ABSTRACT

Some embodiments provide a method that provides a graphical user interface (GUI) on a first device for controlling application of color corrections to a media item by a media editing application on a second device. The method provides a display area that includes several different locations. Each location in the display area corresponds to a set of values. The method provides several user interface (UI) items that are each for (1) moving in the display area and (2) specifying a set of values for a color correction operation that the media editing application applies to the media item. The set of values for the color correction operation specified by each UI item is the set of values is associated with the location at which the UI item is positioned in the display area.

32 Claims, 22 Drawing Sheets

(56) References Cited

U.S. PATENT DOCUMENTS

| | | | |
|---|---|---|---|
| 2005/0055640 A1* | 3/2005 | Alten | 715/719 |
| 2006/0028483 A1* | 2/2006 | Kondo et al. | 345/594 |
| 2007/0061709 A1* | 3/2007 | Marks et al. | 715/517 |
| 2007/0089061 A1 | 4/2007 | Terada | |
| 2007/0192744 A1* | 8/2007 | Reponen | 715/833 |
| 2007/0195343 A1 | 8/2007 | Yoneda | |
| 2007/0294634 A1* | 12/2007 | Kokemohr | 715/781 |
| 2008/0032801 A1* | 2/2008 | Brunet de Courssou | 463/42 |
| 2008/0131010 A1 | 6/2008 | Wilensky | |
| 2008/0226199 A1* | 9/2008 | Breglio | 382/311 |
| 2008/0248834 A1* | 10/2008 | Chatterjee et al. | 455/557 |
| 2009/0204913 A1 | 8/2009 | Kawano et al. | |
| 2009/0263016 A1 | 10/2009 | Kuo | |
| 2010/0011292 A1 | 1/2010 | Marinkovich et al. | |
| 2010/0011299 A1* | 1/2010 | Brodersen et al. | 715/740 |
| 2010/0077316 A1* | 3/2010 | Omansky et al. | 715/751 |
| 2010/0080448 A1 | 4/2010 | Tam et al. | |
| 2010/0174783 A1 | 7/2010 | Zarom | |
| 2010/0177215 A1* | 7/2010 | Kita | 348/234 |
| 2010/0205301 A1* | 8/2010 | Ansari et al. | 709/225 |
| 2010/0238089 A1* | 9/2010 | Massand | 345/1.1 |
| 2011/0026900 A1 | 2/2011 | Lussier et al. | |
| 2011/0093890 A1 | 4/2011 | Araki et al. | |
| 2011/0185297 A1 | 7/2011 | Reid et al. | |
| 2011/0193788 A1* | 8/2011 | King et al. | 345/173 |
| 2011/0246904 A1* | 10/2011 | Pinto et al. | 715/740 |
| 2012/0036480 A1* | 2/2012 | Warner et al. | 715/833 |
| 2012/0210229 A1* | 8/2012 | Bryant et al. | 715/723 |
| 2013/0046789 A1* | 2/2013 | Lulew cz | 707/792 |

OTHER PUBLICATIONS

U.S. Appl. No. 13/912,121, filed Jun. 6, 2013, Warner, Peter, et al.
International Preliminary Report on Patentability for PCT/US2011/046040, Feb. 21, 2013 (mailing date), Apple Inc.
International Search Report and Written Opinion for PCT/US2011/046040, Nov. 8, 2011 (mailing date), Apple Inc.
Portions of prosecution history EP11745864.6, Sep. 20, 2013 (mailing date), Apple Inc.
Author Unknown, "Adobe Photoshop 5.0 Limited Edition User Guide, Chapter 4: Making Color and Tonal Adjustments" Adobe Photoshop 5.0 Limited Edition User Guide, Jan. 1, 1998, pp. 67-68, Adobe Systems Inc., USA.

* cited by examiner

USER INTERFACE CONTROL FOR MEDIA EDITING APPLICATION

BACKGROUND

Many of the media editing applications available today provide numerous different tools for editing media items. Different editing tools have different user interface (UI) items such as sliders, knobs, text boxes, etc., for controlling various edits to media items. With so many tools, the graphical user interface (GUI) of the media editing application may be very crowded and overwhelming to the novice user. In addition, users typically interact with the editing tools by using a cursor to select, click, and drag UI items and/or media items. Thus, the editing controls for editing media clips may be cumbersome, tedious, and time-consuming to use because some operations allow one item or object may be interacted with at a time.

BRIEF SUMMARY

Some embodiments of the invention provide a novel method for providing a user interface (UI) control on a device (e.g., an auxiliary device) for interacting with a media editing application running on another device (e.g., a main device). In some embodiments, the UI control on the auxiliary device synchronizes with a UI control of the media editing application. For instance, an adjustment of the UI control on the auxiliary device causes a corresponding adjustment to the UI control of the media editing application. Similarly, an adjustment of the UI control of the media editing application causes a corresponding adjustment to the UI control provided on the auxiliary device. In some embodiments, the UI controls are for applying color correction operations to media items being edited in the media editing application.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for providing a user interface (UI) control on a device (e.g., an auxiliary device) for interacting with a media editing application running on another device (e.g., a main device). In some embodiments, the UI control on the auxiliary device synchronizes with a UI control of the media editing application. For instance, an adjustment of the UI control on the auxiliary device causes a corresponding adjustment to the UI control of the media editing application. Similarly, an adjustment of the UI control of the media editing application causes a corresponding adjustment to the UI control provided on the auxiliary device. In some embodiments, the UI controls are for applying color correction operations to media items being edited in the media editing application.

Figure 1:
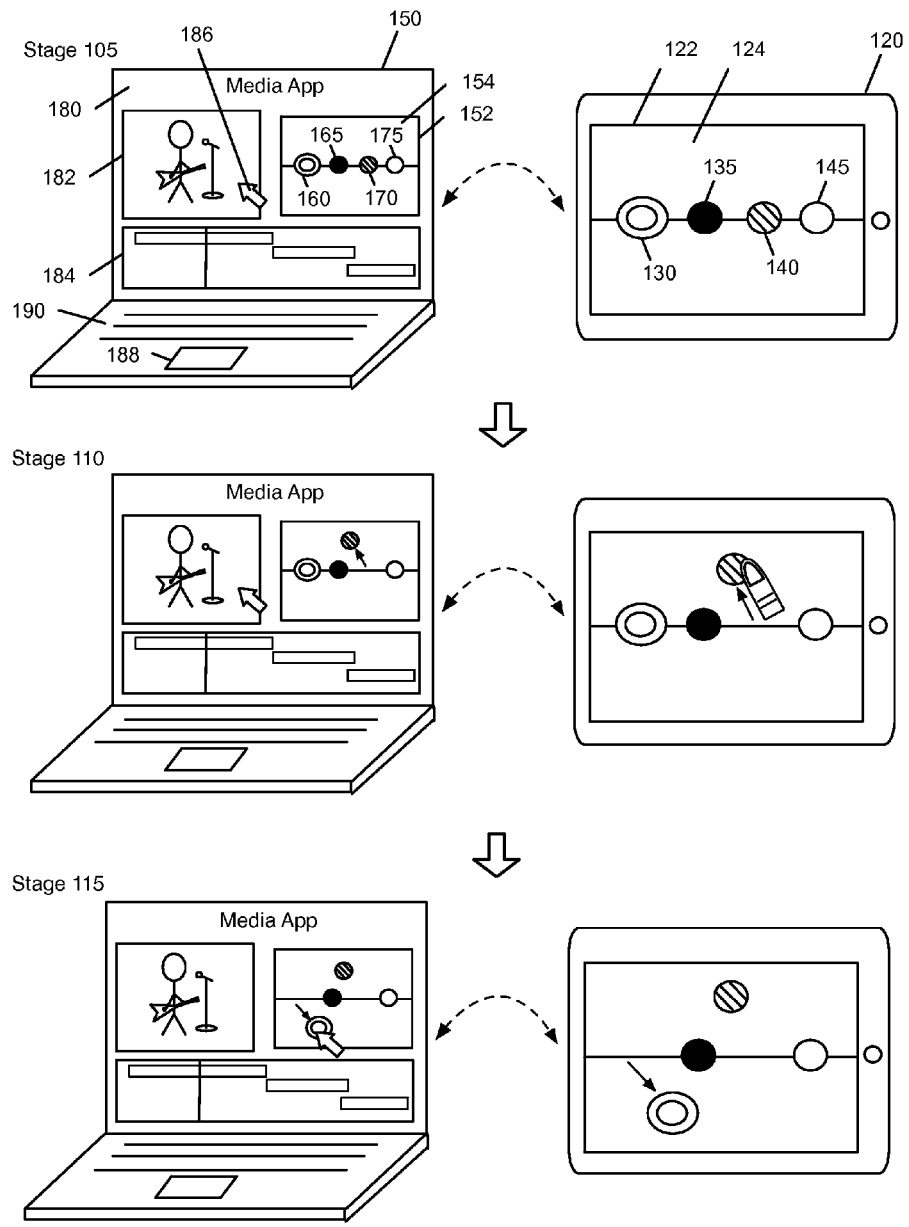
FIG. 1 conceptually illustrates a UI control provided on an auxiliary device for interacting with a media editing application running on a main device.

FIG. 1 conceptually illustrates a UI control 122 provided on a tablet 120 for interacting with a media editing application 180 running on a laptop 150. Specifically, this figure illustrates the media editing application 180 and the UI control 122 at three different stages 105-115 of color correction operations. Each of these stages will be described in further detail below. However, the elements of the laptop 150 and the tablet 120 will be described first.

As shown, the laptop 150 includes a keyboard 190 for receiving keystroke inputs and a touchpad 188 for receiving input to control a cursor 186. The laptop 150 also shows the media editing application 180 running on the laptop 150. Examples of such a media editing application include Final Cut Pro® and iMovies®, which are provided by Apple, Inc.

The media editing application 180 includes a preview display area 182, a composite display area 184, and a color correction control 152. The preview display area 182 displays a preview of a composite presentation that the media editing application 180 creates by compositing several media clips. The composite display area 184 provides a visual representation of the composite presentation being created by a user.

The color correction control 152 is a UI control that is provided by the media editing application 180 to edit media clips. In particular, the color correction control 152 is for applying color corrections to media clips. As shown, the color correction control 152 includes a sliding region 154 and four sliders 160-175 that are each for controlling a different color correction operation that is applied to the media clip displayed in the preview display area 182. Examples of color correction operations include a saturation operation, a contrast operation, a hue operation, an exposure operation, etc. Sliders may also be referred to interchangeably as pucks in this application.

In some embodiments the sliders 160-175 are each for adjusting a particular color correction operation to a particular set of pixels of the media item (e.g., a still image or a frame of a video clip) being edited. For instance, the color correction control 152 of some embodiments is for applying a saturation color correction operation. In some such embodiments, the slider 160 is for applying the saturation color correction operation to all the pixels of the media item, the slider 165 is for applying the saturation color correction operation to darker pixels of the media item (e.g., shadows), the slider 170 is for applying the saturation color correction operation to medium brightness pixels of the media item (e.g., midtones), and the slider 175 is for applying the saturation color correction operation to bright pixels of the media item (e.g., highlights). In some embodiments, the color correction control 152 includes selectable tabs for changing among different color correction operations. Additional details of color correction controls are described in U.S. patent application Ser. No. 13/134,319, filed Jun. 3, 2011, now published as U.S. Publication 2012/0210229, which is hereby incorporated by reference.

As shown in FIG. 1, the tablet 120 displays the UI control 122. The tablet 120 in this example displays the UI control 122 through a touchscreen (not shown) for receiving touch input (e.g., by using a finger or stylus to touch the touchscreen). In some embodiments, the UI control 122 is provided by an application running on the tablet 120. The application may be a standalone application, a component that is part of an application, or an application provided by an operating system running on the tablet. The UI control 122 is a UI control for editing media clips in the media editing application 180 by remotely controlling the color correction control 152 of the media editing application 180. In other words, the UI control 122 is for applying color correction operations to media clips stored on the laptop 150 through the color correction control 152 of the media editing application 180.

The UI control 122 includes a sliding region 124 and four sliders 130-145 that each corresponds to a slider in the color correction control 152. That is, the slider 160 corresponds to the slider 130, the slider 165 corresponds to the slider 135, the slider 170 corresponds to the slider 140, and the slider 145 corresponds to the slider 175. Like the sliders 160-175, each of the sliders 130-145 is for controlling a different color correction operation (e.g., a saturation operation, a contrast operation, a hue operation, an exposure operation, etc.) that is applied to the media clip displayed in the preview display area 182.

An example operation of the UI control 122 and the color correction control 152 will now be described by reference to the three stages 105-115 illustrated in FIG. 1. In the first stage 105, the UI control 122 is synchronized with the color correction control 152 of the media editing application 180. Specifically, the four sliders 160-175 are positioned on a horizontal line near the middle of the sliding region 154 of the color correction control 152. Likewise, the four corresponding sliders 130-145 are positioned on a horizontal line near the middle of the sliding region 124 of the UI control 122. In some embodiments, the arrangement of the sliders 160-175 in the color correction control 152 is a default arrangement.

In this example, the horizontal line of each of the controls represents a zero value. Locations above the horizontal line in the sliding region represent positive values with locations farther from the horizontal line representing larger positive values compared to locations closer to the horizontal line. In contrast, locations below the horizontal line in the sliding region represent negative values with locations farther from the horizontal line representing larger negative values compared to locations closer to the horizontal line. For each particular slider, the value of the color correction operation associated with the particular slider is the value associated with the location of the particular slider in the sliding region along the y-axis. Thus, the color correction operation associated with the particular slider may be adjusted by moving the particular slider to different locations in the sliding region along the y-axis. Additional details of two-dimensional slider controls are described in U.S. patent application Ser. No. 13/134,319, filed Jun. 3, 2011, now published as U.S. Publication 2012/0210229.

For some color correction operations (e.g., hue color correction operations) of some embodiments, the value(s) of the color correction operation associated with a particular slider are the values associated with the location of the particular slider in the sliding region along the x-axis and the y-axis. As such, the color correction operation associated with the particular slider may be adjusted by moving the particular slider to different locations in the sliding region along the x-axis and/or y-axis.

The second stage 110 illustrates an example of performing a color correction operation using the UI control 122 provided on the tablet 120. As shown, a finger provides touch input (e.g., by touching the touchscreen and dragging across the touchscreen) to move the slider 140 up and towards the left, as indicated by an arrow. In response to the movement of the slider 140 in the UI control 122, the media editing application 180 has performed a corresponding movement of the slider 170 in the color correction control 152 in order to synchronize the color correction control 152 with the UI control 122. In addition, when the media editing application 180 moves the slider 170, the media editing application 180 applies the color correction operation associated with the slider 170 to the media clip being edited by the media editing application 180, which is displayed in the preview display area 182.

The third stage 115 illustrates an example of performing a color correction operation using the color correction control 152 of the media editing application 180. At this stage, the slider 160 has been moved down and towards the right, as indicated by an arrow, by performing a cursor control operation (e.g., by clicking or tapping the touchpad 188) with the cursor 186. When the media editing application 180 moves the slider 160, the media editing application 180 applies the color correction operation associated with the slider 160 to the media clip being edited by the media editing application 180, which is displayed in the preview display area 182. In response to the movement of the slider 170 in the color correction control 152, the application that provides the UI control 122 has performed a corresponding movement of the slider 140 in the UI control 122 in order to synchronize the UI control 122 with the color correction control 152.

As described above, FIG. 1 illustrates a UI control provided on an auxiliary device that synchronizes with a UI control of a media editing application running on a main device. This way, color correction operations may be applied to media clips in the media editing application by using the UI control provided on the auxiliary device or by using the UI control of the media editing application running on the main device. Also, in many of the figures described above and below, the UI controls of the auxiliary device appear the same or similar as the UI control of the media editing application. In some embodiments, the UI controls may appear different from one another. For instance, the size, shape, color, etc. of the sliders of one UI control may be different from the corresponding sliders on the other UI control. Still, in some embodiments, some or all of the components of one of the UI controls may correspond to completely different types of components in the other UI control. For example, a text box component for entering numeric values of one UI control may have a corresponding component that is a one-dimensional slider bar for adjusting the numeric values.

While FIG. 1 illustrates a UI control provided on a tablet that interacts with a media editing application running on a laptop, one of ordinary skill in the art will recognize that these devices are only used for purposes of explanation and that the invention is not limited to such devices. For instance, the UI control on the tablet may be provided on a smartphone, a personal digital assistant (PDA), portable gaming device, or any other type of device that can serve as an auxiliary device. In addition, the media editing application may run on a desktop computer, server, or any other type of device that can serve as a main device.

The examples and embodiments in this application described above and below show a UI control provided on an auxiliary device for interacting with a media editing application. However, one of ordinary skill in the art will recognize that the UI control is an example of one of an infinite number of different UI controls (e.g., transport controls, effects controls, curve controls, color wheel controls, etc.) that may be configured any number of different ways. Additionally, one of ordinary skill in the art would realize that the UI control of the auxiliary device of some embodiments is configured to interact with additional and/or other types of applications. For instance, the UI control of the auxiliary device may interact with image editing applications, audio editing applications, diagramming applications, video games, etc.

Several more detailed embodiments of the invention are described in the sections below. Section I provides a conceptual description of connecting a UI control on a main device with a UI control on an auxiliary device. Next, Section II conceptually describes synchronizing a UI control on a main device with a UI control on an auxiliary device. Section III follows this with a description of several example operations that are performed on an auxiliary device. Next, Section IV describes the software architecture of a media editing application of some embodiments as well as the software architecture of an application running on an auxiliary device that provides a UI control for the media editing application. Finally, Section V describes an electronic system that implements some embodiments of the invention.

I. UI Control Setup

As described above, a UI control provided on an auxiliary device may be used to control a UI control of a media editing application running on a main device. However, before the UI control on the auxiliary device can be used, the devices must be configured to communicate with each other. The following section describes one way to configure the devices to communicate with each other.

Figure 2:
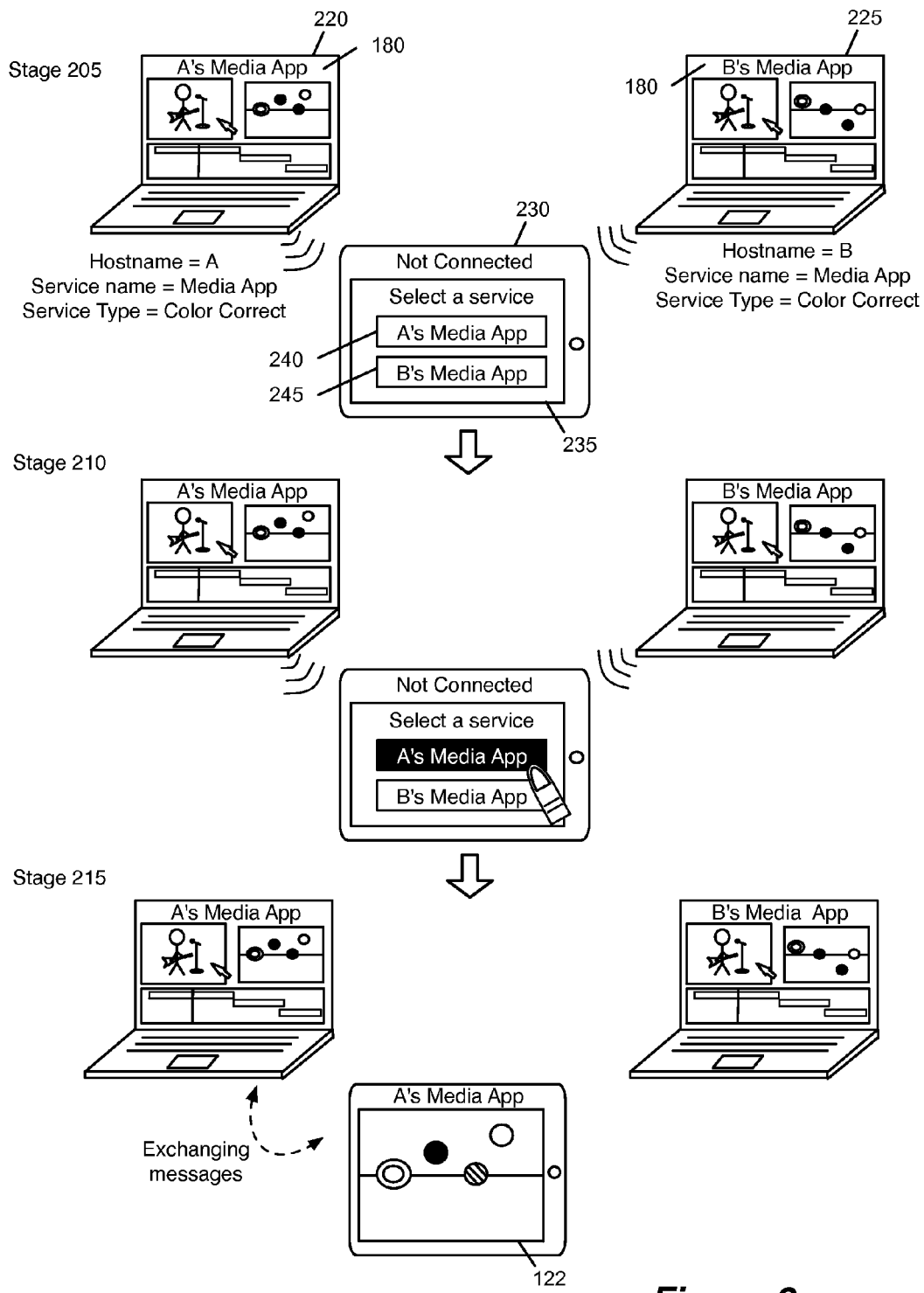
FIG. 2 conceptually illustrates a technique for establishing communication between a UI control on an auxiliary device and a media editing application running on a main device.

FIG. 2 conceptually illustrates a technique for establishing communication between a UI control on an auxiliary device and a media editing application running on a main device. In particular, FIG. 2 illustrates three different stages 205-215 of a tablet 230 establishing communication with one of two laptops 220 and 225. In this example, each of the laptops 220 and 225 is similar to the laptop 150 described above by reference to FIG. 1. As shown, a copy of the media editing application 180 is running on each of the laptops 220 and 225, which are labeled A's Media App and B's Media App, respectively. In addition, the tablet 230 is similar to the tablet 120 that is described above by reference to FIG. 1, but the tablet 230 is displaying a graphical user interface (GUI) 235 for connecting to a main device.

In the first stage 205, the laptops 220 and 225 are each wirelessly broadcasting a service through a communication interface (e.g., a Wi-Fi adapter, a Bluetooth® adapter, etc.). As shown, each laptop is broadcasting a service that specifies a hostname, a service name, and a service type. That is, laptop 220 is broadcasting a service that specifies "A" as the hostname, "Media App" as the service name, and "Color Correct" as the service type. Laptop 225 is broadcasting similar information except that the service specifies "B" as the hostname. The hostname of some embodiments is defined as the network name of the device. In some embodiments, the hostname of some embodiments may be defined (e.g., through a preferences menu provided by the media editing application 180) as any name (e.g., Bob's computer, laptop XYZ, etc.).

In some embodiments, a laptop starts broadcasting its service when the media editing application on the laptop is started. In other embodiments, the laptop starts broadcasting its service when the color correction control of the media editing application on the laptop is invoked (e.g., by using a hotkey, a keystroke, a series of keystrokes, a combination of keystrokes, an option from a pull-down menu or a pop-up menu, etc.).

The laptops 220 and 225 of some embodiments use a service discovery protocol to broadcast their services. In some embodiments, a service discovery protocol is a set of network protocols that allows for automatic detection of devices and services provided by the devices on a network. The network of some embodiments is a single broadcast domain network. Different embodiments use different service discovery protocols. Examples of such protocols include Apple Bonjour®, zero configuration networking (zeroconf), a service location protocol (SLP), simple service discovery protocol (SSDP), Bluetooth® service discovery protocol (SDP), etc.

The first stage 205 also illustrates that the tablet 230 has detected the services broadcasted by the laptops 220 and 225 through a communication interface (e.g., a Wi-Fi adapter, a Bluetooth® adapter, etc.). The tablet 230 of some embodiments uses a service discovery protocol such as any of the service discovery protocols mentioned above in order to detect broadcasted services. In some embodiments, an application that provides the GUI 235 detects the services. The application in some such embodiments also provides the UI control 122. In other embodiments, the operating system running on the tablet 230 detects the services.

In some embodiments, the tablet 230 starts detecting broadcasted services when the application (e.g., the application that provides the UI control 122) that provides the GUI 235 is initiated. As noted above, the first stage 205 shows that the tablet 230 has detected the services broadcasted by the laptops 220 and 225. As shown, the GUI 235 includes selectable UI items 240 and 245 that are for initiating communication with the media editing applications on the laptops 230 and 235, respectively. The selectable UI items 240 and 245 each displays the hostname and service name of the service broadcasted by the respective laptops 220 and 225.

The second stage 210 illustrates that one of the selectable UI items 240 and 245 has been selected to connect to one of the laptops 230 and 235. More specifically, a finger has provided touch input (e.g., by tapping the touchscreen) to select the selectable UI item 240 and initiate communication with the laptop 220. The selection of the UI item 240 is indicated by a highlighting of the UI item 240.

In the third stage 215, the tablet 230 has established communication (e.g., by establishing a set of connections) with the laptop 220. Specifically, the tablet has exchanged messages with the laptop 220 in order to synchronize the UI control 122 with the color correction control of A's media editing application that is running on the laptop 220. As shown, tablet 230 has synchronized with A's media editing application because the sliders of the UI control 122 arranged the same way as the sliders in the color correction control of A's media editing application.

Figure 3:
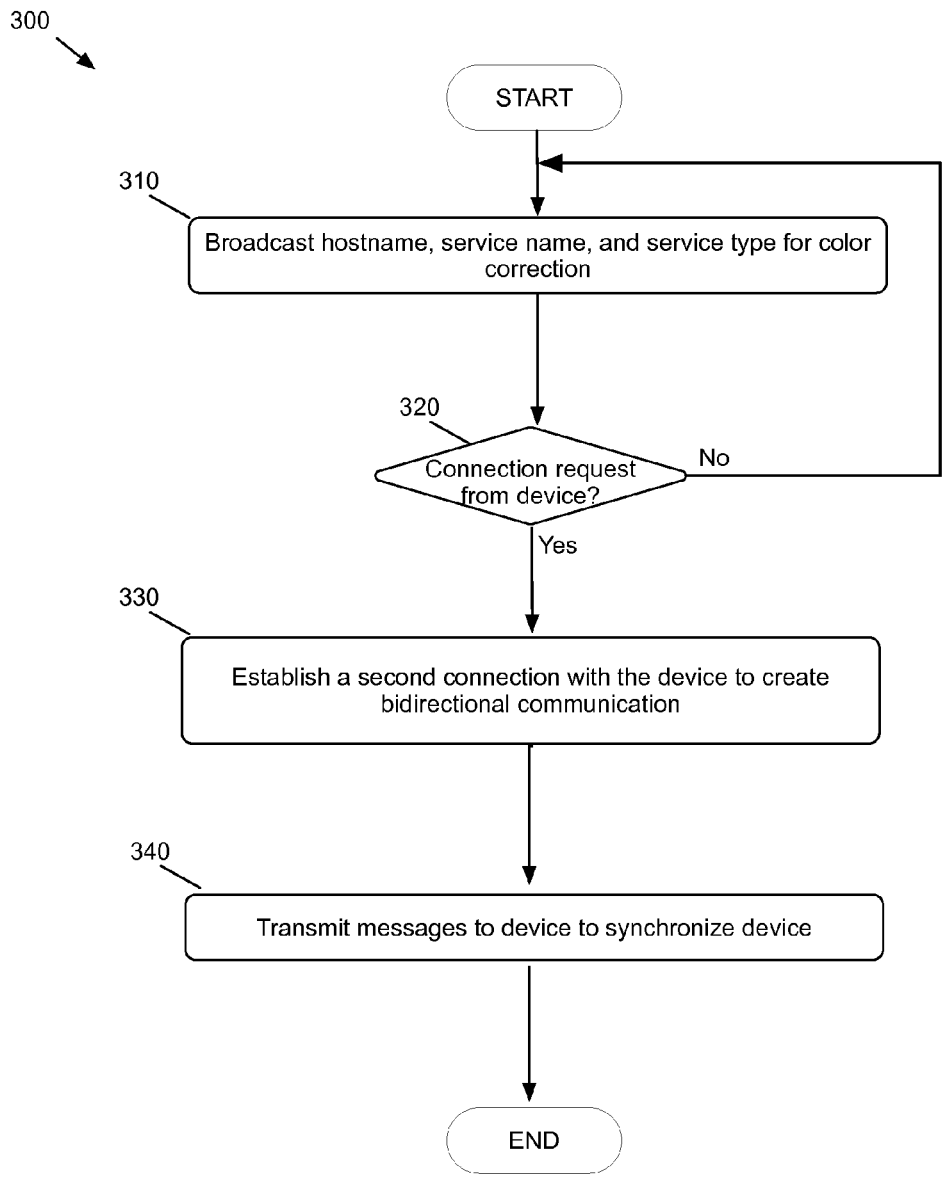
FIG. 3 conceptually illustrates a process of some embodiments for broadcasting a service to communicate with a media editing application.

FIG. 3 conceptually illustrates a process 300 of some embodiments for broadcasting a service to communicate with a media editing application. In some embodiments, the process 300 is performed by a media editing application running on a main device such as the ones described above and below by reference to FIGS. 1, 2, 5, 6, 10, 19, and 20. The media editing application in some embodiments performs the process 300 when the media editing application is started while the media editing application in other embodiments performs the process 300 when the media editing application's color correction control is invoked.

The process 300 starts by broadcasting (at 310) a service that specifies a hostname parameter, a service name parameter, and a service type parameter. The hostname parameter is the hostname of the device from which the process 300 is broadcasting (e.g., the device on which the media editing application is running). The service name parameter is a name used to identify the service being broadcasted. In some embodiments, the service name parameter is the name of the media editing application. The service type parameter specifies the type of service that is broadcasted. In some instances, an application on a device may provide several different services for the application. Thus, using the hostname and service name is not sufficient to differentiate among the several services broadcasted for the application. As such, the service type parameter is used to differentiate among different services that may be provided by a single application running on a device.

Next, the process 300 determines (at 320) whether a connection request from a device (e.g., an auxiliary device) is received. In some embodiments, the process 300 receives a request to establish a first connection with a device that the device uses to communicate through. In some embodiments, the first connection is unidirectional and only allows the device to send communications (e.g. messages), but does not allow the device to receive communications. When the process 300 determines that a connection from a device is received, the process 300 establishes a connection (e.g., by establishing a network socket) with the device and then proceeds to 330. Otherwise, the process 300 returns to 310 to continue broadcasting the service.

At 330, the process 300 establishes a second connection (e.g., by establishing a network socket) with the device in order to create bidirectional communication with the device. In some embodiments, the second connection is unidirectional and only allows the device to receive communications, but does not allow the device to send communications. In this way, the first and second connections, collectively, facilitate bidirectional communication with the device.

After establishing the second connection, the process 300 transmits (at 340) messages to the device to synchronize the device. In some embodiments, the process 300 transmits messages to the device to synchronize a UI control provided on the device with a UI control that provided by a media editing application that is performing the process 300. Referring to FIG. 2 as an example, the process 300 would transmit messages to the tablet 230 in order to synchronize the arrangement of the sliders of the UI control 122 on the tablet 230 with the arrangement with the sliders of the color correction control of A's media editing application.

Although FIG. 3 illustrates a process that performs a particular set of operations, the process of different embodiments may perform additional and/or different operations. For instance, in some embodiments, the connection established at operation 320 is for bidirectional communication. Thus, the process of such embodiments does not perform operation 330 to implement bidirectional communication with the device.

Figure 4:
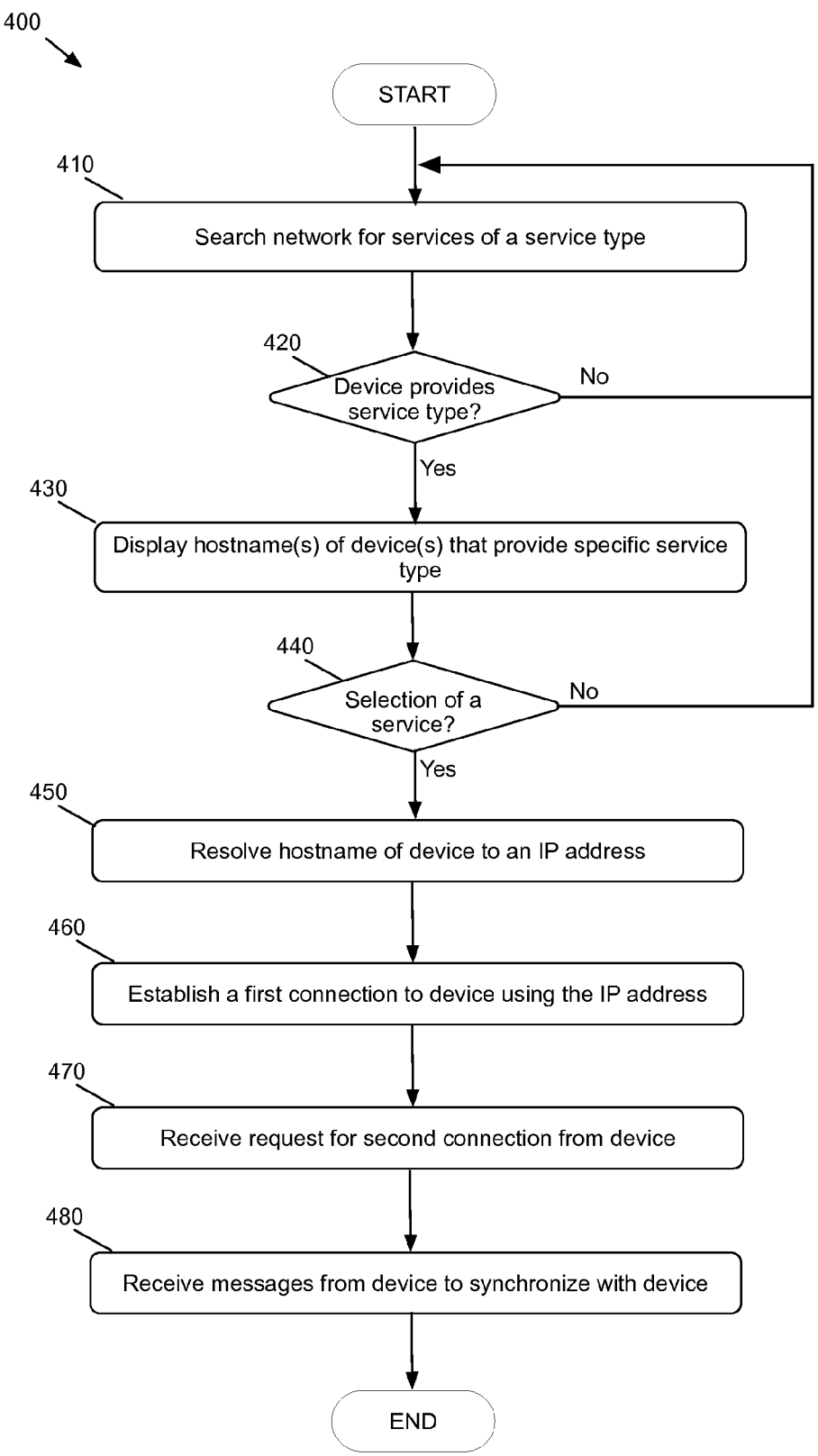
FIG. 4 conceptually illustrates a process of some embodiments for detecting a service that provides communication with a media editing application.

FIG. 4 conceptually illustrates a process of some embodiments for detecting a service that provides communication with a media editing application. The process 400 of some embodiments is performed by an application running on an auxiliary device such as the ones described above and below by reference to FIGS. 1, 2, 5, 6, 10, 11, 12, 14, 15, 16, 18, 19, and 20. In some embodiments, the application performs the process 400 when the application is started while, in other embodiments, the application performs the process 400 when the application's GUI for connecting to a main device (e.g., the GUI 235) is invoked.

The process 400 begins by searching (at 410) a network for services of a service type. As noted above, the main device of some embodiments broadcasts a service that specifies a service type along with a service name and the main device's hostname. Referring to FIG. 2 for example, the laptops 220 and 225 broadcast a service that specifies a "Color Correct" service type. The process 400 of different embodiments searches the network for services of different service types. In some embodiments, the process 400 may search for any services that provide one or more of several different service types.

The process 400 in some embodiments uses a service discovery protocol to search the network for services of a service type. Examples of service discovery protocols include Apple Bonjour®, zero configuration networking (zeroconf), a service location protocol (SLP), simple service discovery protocol (SSDP), Bluetooth® service discovery protocol (SDP), etc. In some embodiments, the network that the process 400 is searching is a single broadcast domain network.

Next, the process 400 determines (at 420) whether a device that provides the service type is identified. In some embodiments, the process 400 uses a service discovery protocol mentioned above to make the determination. When the process 400 determines that a device that provides the service type is not identified, the process 400 returns to 410 to continue searching the network. When the process 400 determines that a device that provides the service type is identified, the process 400 displays (at 430) the hostname of the host. As mentioned above, some embodiments broadcast a service that specifies the hostname of the host. In some embodiments, the process 400 displays the hostname and/or the service name specified by the service on a GUI for connection to a main device (e.g., the GUI 235).

The process 400 then determines (at 440) whether a selection of a service is received. When the process 400 determines that a selection of a service is received, the process 400 proceeds to 450. Otherwise, the process 400 returns to 410 to continue searching for services of a service type and displaying the hostnames of devices that provide the services of the service type.

At 450, the process 400 resolves the hostname of the device that is providing the selected service to an Internet Protocol (IP) address. In some embodiments, the process 400 uses a service discovery protocol explained above to resolve the hostname of the device.

Next, the process 400 establishes (at 460) a first connection to the device using the IP address. The process 400 of some embodiments uses the IP address to establish a network socket with the device. In some embodiments, the first connection allows for unidirectional communication.

Next, the process 400 receives (at 470) a request for a second connection from the device. In some embodiments, the process 400 establishes the second connection by establishing a network socket with the device. The second connection allows for unidirectional communication that is in the opposite direction as the first connection. This way, the first and second connections, collectively, facilitate bidirectional communication with the device.

Finally, the process 400 receives (at 480) messages in order to synchronize with the device. The process 400 of some embodiments receives messages from the device to synchronize a UI control provided by a media editing application that is running on the device with UI control that provided by an application is performing the process 400. Referring to FIG. 2 as an example, the process 400 would receive messages from A's media editing application in order for the arrangement of the sliders of the UI control 122 on the tablet 230 to synchronize with the arrangement of the sliders of the color correction control of A's media editing application.

While FIG. 4 illustrates a process that performs a particular set of operations, the process of different embodiments may perform additional and/or different operations. For instance, in some embodiments, the connection established at operation 460 allows for bidirectional communication. Therefore, the process of such embodiments does not perform operation 470 to implement bidirectional communication with the device.

II. UI Control Synchronization

The previous section describes ways to establish communication between a main device and an auxiliary device. The following section will describe techniques for synchronizing the main device with the auxiliary device after communication has been established between the devices.

Figure 5:
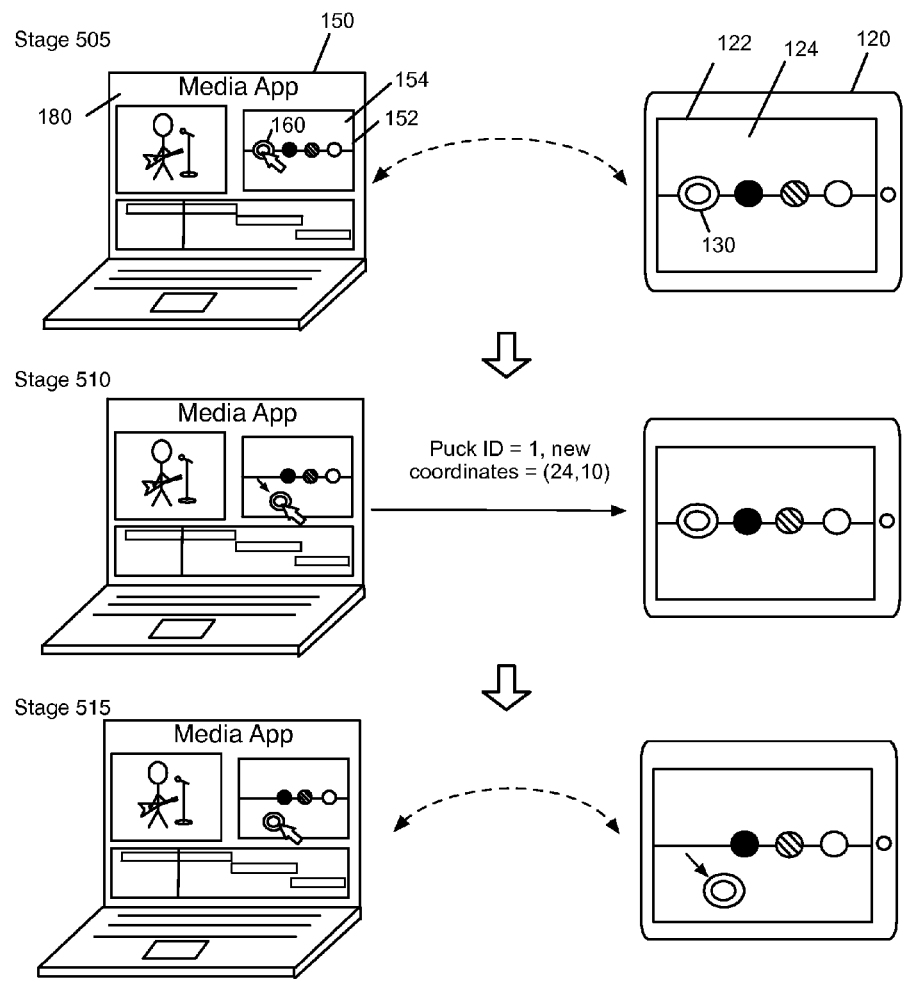
FIG. 5 conceptually illustrates a UI control provided on an auxiliary device that is synchronized with a media editing application running on a main device.

FIG. 5 conceptually illustrates a UI control provided on an auxiliary device that is synchronized with a media editing application running on a main device. Specifically, FIG. 5 illustrates three stages 505-515 of a technique for synchronizing a puck movement of the UI control 122 with a corresponding puck of the color correction control 152 of the media editing application 180.

The first stage 505 shows the laptop 150 and the tablet 120 at a similar stage as the laptop 150 and the tablet 120 illustrated in the first stage 105 of FIG. 1. The second stage 510 illustrates that the slider 160 of the color correction control 152 has been moved down and towards the right by performing a cursor control operation (e.g., by clicking or tapping the touchpad 188) with the cursor 186.

The second stage 510 also illustrates that the media editing application 180 sends a message to the tablet 120 specifying the identification of the puck that has moved and the new location of the puck. As shown, the message specifies that the puck with a puck ID of 1 has moved to a location that corresponds to coordinates (24,10). In this example, upon the completion of the cursor control operation and before sending the message to the tablet 120, the media editing application 180 has identified the puck that was moved (i.e., slider 160 in this example, which has a puck ID of 1), identified the new location of the puck, and generated a message specifying the identification of the puck and the new location of the puck.

The third stage 515 shows that the tablet 120 has used the message that the media editing application 180 sent to the table 120 in order to synchronize the UI control 122 with the color correction control 152. As shown in this stage, the position of the slider 130 relative to the sliding region 124 of the UI control 122 is the same as the position of the slider 160 relative to the sliding region 154 of the color correction control 152.

Figure 6:
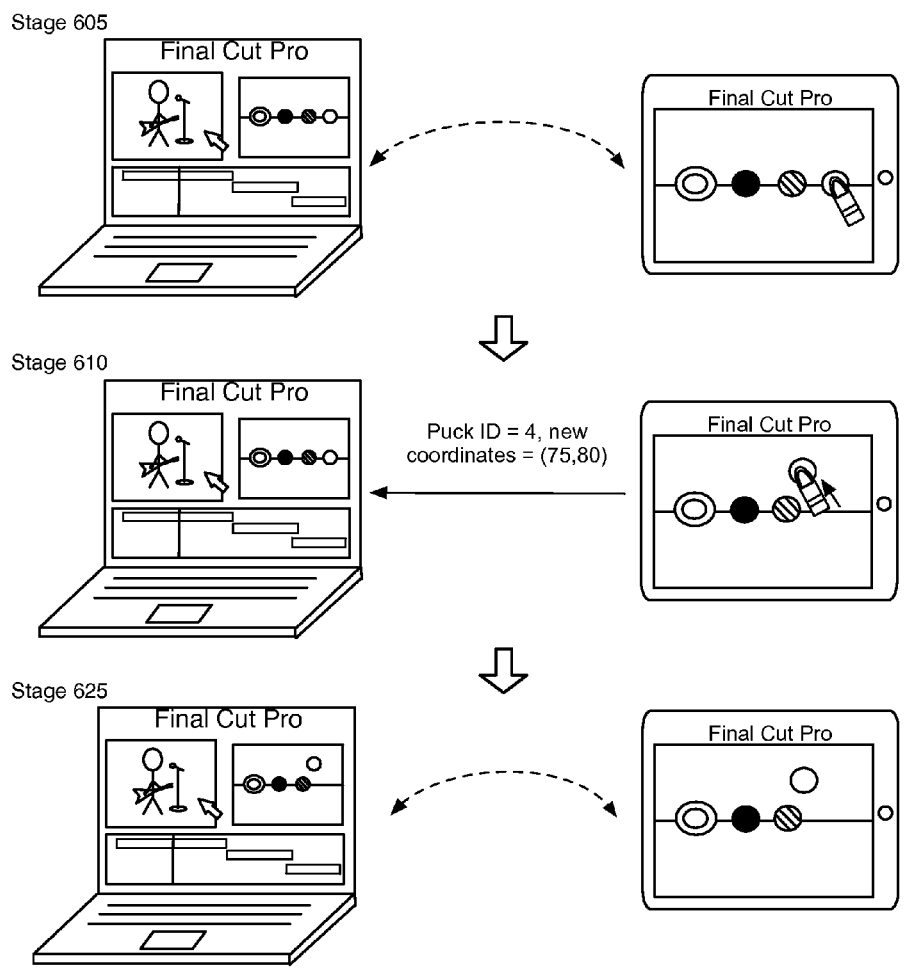
FIG. 6 conceptually illustrates a color correction control of a media editing application running on a main device that is synchronized with a UI control provided on an auxiliary device.

FIG. 6 conceptually illustrates a color correction control of a media editing application running on a main device that is synchronized with a UI control provided on an auxiliary device. In particular, FIG. 6 illustrates three stages 605-615 that show a synchronization of a puck of a color correction control of a media editing application with a corresponding puck of a UI control.

The first stage 605 illustrates the laptop 150 and the tablet 120 in a similar stage as the laptop 150 and the tablet 120 illustrated in the first stage 105 of FIG. 1. The second stage 610 shows that the slider 145 of the UI control 122 has been moved up and towards the left by a finger that provides touch input (e.g., by touching the touchscreen and dragging across the touchscreen).

The second stage 610 also shows that the application that provides the UI control 122 sends a message to the media editing application 180 specifying the identification of the puck that has moved and the new location of the puck. As shown, the message specifies that the puck with a puck ID of 4 has moved to a location that corresponds to coordinates (75,80). For this example, upon the completion of the touch input and before sending the message to the media editing application 180, the application that provides the UI control 180 has identified the puck that was moved (i.e., slider 145 in this example, which has a puck ID of 4), identified the new location of the puck, and generated a message specifying the identification of the puck and the new location of the puck.

The third stage 615 illustrates that the media editing application 180 has used the message that the application that provides the UI control 120 sent to the media editing application 180 in order to synchronize the color correction control 152 with the UI control 122. As illustrated in this stage, the position of the slider 175 relative to the sliding region 154 of the color correction control 152 is the same as the position of the slider 145 relative to the sliding region 124 of the UI control 122.

The FIGS. 5 and 6 described above use an example coordinate system for identifying the location of the pucks in the UI controls. Specifically, a Cartesian coordinate system is used with an x-axis along the bottom side of the UI controls having values from 0-100, a y-axis along the left side of the UI controls having values from 0-100, and the origin located at the lower left corner of the UI controls. One of ordinary skill in the art will realize that different coordinate systems and/or different ranges of coordinate values may be used in different embodiments. In some embodiments, the UI controls may each use different coordinate systems and/or ranges of coordinate values. In such embodiments, each UI control translates location data that it receives (e.g., via messages) from the other UI control into the coordinate system and/or ranges of values that the UI control uses.

FIGS. 5 and 6 also illustrate synchronizing one auxiliary device with a main device. However, one of ordinary skill in the art would recognize that multiple auxiliary devices could connect to a main device and synchronize with the main device using similar synchronization techniques that are described above. For instance, when an adjustment is made on a first auxiliary device, the first auxiliary device sends a message to the main device to make the corresponding adjustment. Then, the main device relays the message to a second auxiliary (and any other auxiliary devices connected to the main device) to make the corresponding adjustment that was made on the first auxiliary device. As another example, when an adjustment is made on the main device, the main device sends a message to each of the auxiliary devices that are connected to it so that these auxiliary devices can make the corresponding adjustments.

In addition, the examples shown in FIGS. 5 and 6 illustrate sending a message that specifies the positions of pucks at the end of an adjustment operation (e.g., when a finger is lifted off a touchscreen, a cursor click is released, etc.). However, in some embodiments, messages may be transmitted during an adjustment operation (e.g., based on a movement threshold and/or a time threshold).

Figure 7A:
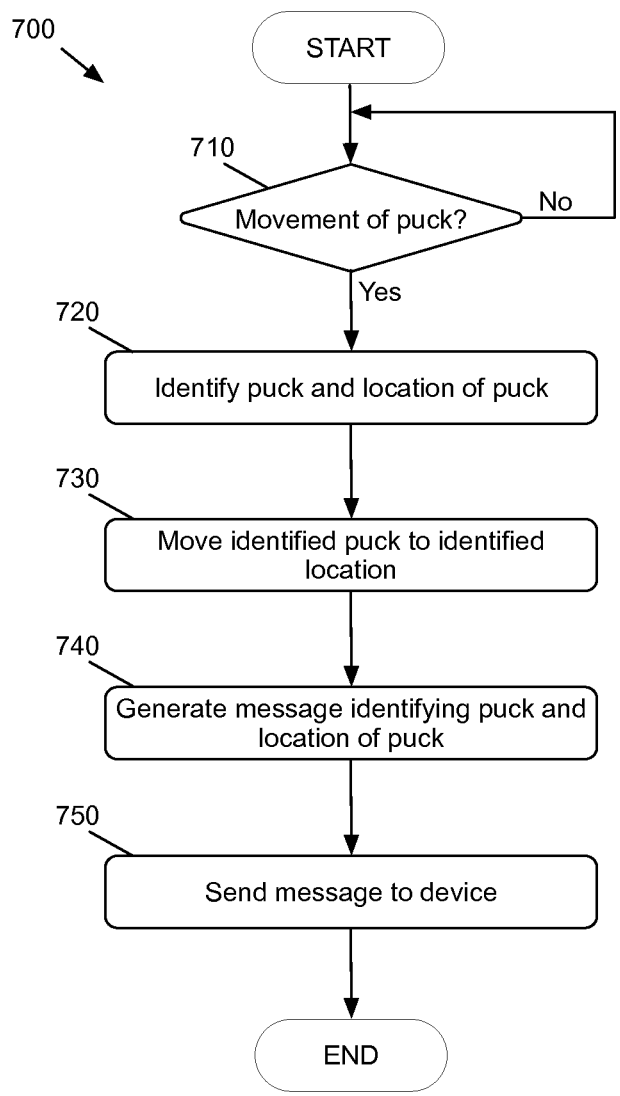
FIG. 7A conceptually illustrates a process of some embodiments for synchronizing pucks of a UI control with pucks of another UI control.

FIG. 7A conceptually illustrates a process 700 of some embodiments for synchronizing pucks of a UI control with pucks of another UI control. In some embodiments, the process 700 is performed by a media editing application running on a main device that provides a color correction control (e.g., the media editing application described above and below by reference to FIGS. 1, 2, 5, 6, 10, 19, and 20) that synchronizes with a UI control of an auxiliary device that is connected to the main device. In addition, the process 700 of some embodiments is performed by an application on an auxiliary device that provides a UI control (e.g., the UI control described above and below by reference to FIGS. 1, 2, 5, 6, 10, 11, 12, 14, 15, 16, 18, 19, and 20) that synchronizes with a media editing application running on a main device that is connected to the auxiliary device. In some embodiments, the process 700 is repeatedly performed in order to poll for changes in the UI control on the device on which the process 700 is performing. For purposes of explanation, FIG. 7A will refer to the device on which the process 700 is performing as the local device and the device with which the local device is synchronizing as the remote device.

The process 700 starts by determining (at 710) whether a puck of a UI control has moved. When the process 700 determines that a puck of the UI control has moved, the process 700 proceeds to 720. Otherwise, the process 700 returns to 710 to continue detecting for movement of a puck of the UI control. In some embodiments, the process 700 determines that a puck of the UI control has moved when the process 700 receives input (e.g., a cursor control operation or touch input operation) and determines that the input is associated with a puck.

In some embodiments, the process 700 determines that the puck has moved based on a threshold amount of input. For instance, the process 700 determines that a puck has moved when the process 700 identifies a threshold amount of distance input (e.g., the distance of a cursor control operation or touch input operation), a threshold amount of speed input (e.g., the speed of a cursor control operation or touch input operation), a threshold amount of acceleration input (e.g., the acceleration of a cursor control operation or touch input operation), or a threshold for any other type of input.

Alternatively, or in conjunction with the threshold amount of input, the process 700 of some embodiments determines that a puck has moved based on a time threshold. For example, during an input operation (e.g., a cursor control operation or touch input operation) the process 700 identifies an input operation that continues for a threshold amount of time. Thus, if the input operation does not include movement input (e.g., the finger is held still during a touch input or the cursor controller is not moved during a cursor control operation), the process 700 determines that a puck associated with the input has moved.

In some embodiments, the process 700 determines that a puck of the UI control has moved based on information that the process 700 receives from a UI framework running on an operating system of the local device. For instance, the process 700 of some such embodiments might receive from the UI framework information indicating that an input operation has been performed (e.g., a cursor control operation such as a click-and-drag or touch input operation such as a touch-and-drag). The process 700 of some embodiments determines that the input operation is for moving a puck. For example, the location of the input operation is at or near the location of a puck.

Next, the process 700 identifies (at 720) the puck that has moved and the location of the puck after it has moved. In some embodiments, the process 700 identifies the puck based on a puck identifier and identifies the location of the puck by identifying the coordinates (e.g., Cartesian coordinates, Polar coordinates, etc.) of the location at which the puck is positioned in the UI control (e.g., the position in a sliding region of a UI control). In some embodiments, the process 700 identifies the coordinates based on the input operation associated with the puck.

The process 700 then moves (at 730) the identified puck to the identified location. In some embodiments, the process 700 moves the identified puck by modifying data that represents the location of the puck to specify the identification location.

After moving the puck, the process 700 generates (at 740) a message that includes the identification of the puck and the new location of the puck. Different embodiments may use any number of different message formats. Regardless of the message format used, in some embodiments, the applications that provide the UI controls use the same message format to communicate with each other while, in other embodiments, each application can (1) identify the message formats used by the other applications and (2) process the message.

Finally, the process 700 sends (at 750) the generated message to the remote device so that the UI control on the local device can synchronize with the UI control running on the remote device. The process 700 sends the message using any number of different communication protocols in different embodiments. In some embodiments, the process 700 uses a wireless communication protocol (e.g., 802.11, Bluetooth®, General Packet Radio Services (GPRS), Enhanced Data GSM Environment (EDGE), Universal Mobile Telecommunication Service (UMTS), Wideband Code-Division Multiple Access (WCDMA), etc.). The process 700 then ends.

Figure 7B:
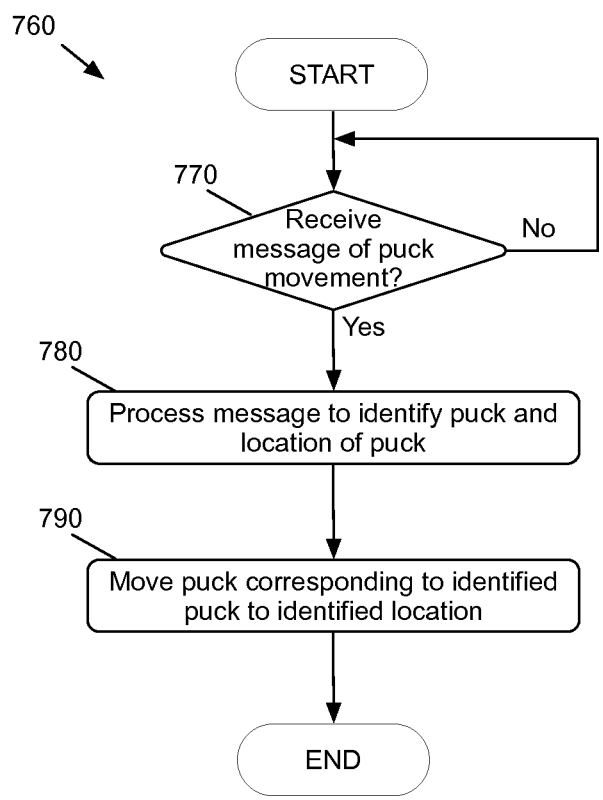
FIG. 7B conceptually illustrates a process of some embodiments for synchronizing pucks of a UI control with pucks of another UI control.

FIG. 7B conceptually illustrates a process 760 of some embodiments for synchronizing pucks of a UI control with pucks of another UI control. The process 760 of some embodiments is performed by a media editing application running on a main device that provides a color correction control (e.g., the media editing application described above and below by reference to FIGS. 1, 2, 5, 6, 10, 19, and 20) that synchronizes with a UI control of an auxiliary device that is connected to the main device. In some embodiments, the process 760 is performed by an application on an auxiliary device that provides a UI control (e.g., the UI control described above and below by reference to FIGS. 1, 2, 5, 6, 10, 11, 12, 14, 15, 16, 18, 19, and 20) that synchronizes with a UI control of a media editing application running on a main device that is connected to the auxiliary device. For purposes of explanation, FIG. 7B will refer to the device on which the process 760 is performing as the local device and the device with which the local device is synchronizing as the remote device. In some embodiments, the process 760 is repeatedly performed in order to poll for changes in the UI control on the remote device in order to synchronize the UI control on the local device (i.e., the device on which the process 760 is performing) with the UI control on the remote device.

The process 760 begins by determining (at 770) whether a message indicating puck movement in the UI control on the remote device is received. When the process 760 determines that a message indicating puck movement in the UI control on the remote device is received, the process proceeds to 780. Otherwise, the process 760 returns to 770 to continue detecting for messages indicating movement of a puck of the UI control on the remote device.

Next, the process 760 processes (at 780) the message in order to identify the puck of the UI control on the remote device that has moved and the new location of the puck. In some embodiments, the process 760 processes the message by identifying the message format and identifying the fields that correspond to the identification of the puck and the location of the puck. Based on the identified puck, the process 760 identifies the puck of the UI control of the local device that corresponds to the identified puck of the UI control of the remote device.

Finally, the process 760 moves (at 790) the puck of the UI control of the local device that corresponds to the identified puck to the identified location. The process 760 of some embodiments moves the puck of the UI control of the local device by modifying data that represents the location of the puck to specify the identification location. In some embodiments, the process 760 may translate the identified location into the coordinate system that is used by the UI control on local device.

Figure 8:
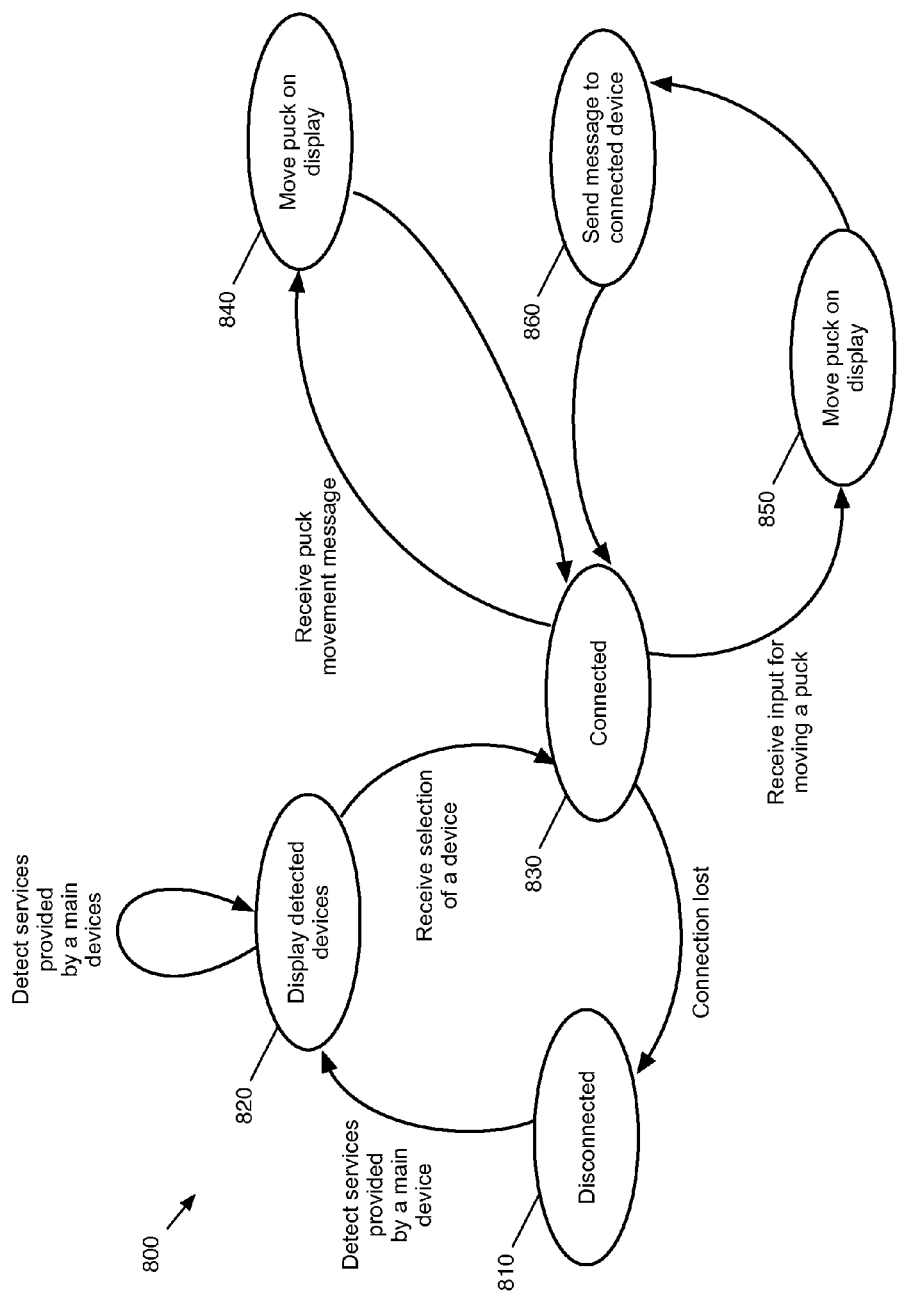
FIG. 8 conceptually illustrates a state diagram of a UI control of some embodiments that runs on an auxiliary device.

The FIGS. 5 and 6 that are described above discuss examples of synchronizing a UI control on an auxiliary device and a UI control on a main device. The following FIGS. 8 and 9 conceptually illustrate state diagrams of each UI control of some embodiments. FIG. 8 conceptually illustrates a state diagram 800 of an application of some embodiments that runs on an auxiliary device and provides a UI control. In particular, this figure illustrates several states of the application of some embodiments and transitions between these states.

At state 810, the application is in a disconnected state. That is, the application is not connected to media editing application on a main device. In some embodiments, the application starts in the state 810 when the application is started. When the application is in the state 810, the application is searching for services that are broadcasted on a network (e.g., a single broadcast domain network). In some embodiments, the application is searching for defined types of services that provide connectivity to a UI control or an application that provides a UI control (e.g., media editing application 180). The application of some embodiments also displays a GUI for connecting to a main device (e.g., the GUI 235) while in the state 810. When the application detects a service with a defined service type in the state 810, the application transitions to state 820.

At the state 820, the application displays the service provided by a main device. In some embodiments, the application displays the hostname and service name of the service provided by the detected service (e.g., the GUI 235). When the application is in the state 820, the application may also continue detecting services with a defined service type. For instance, each time the application detects a service, the application displays the service provided by the newly detected device along with the other services that the application has previously detected and then continues detecting services with a defined service type. When the application receives a selection of a service provided by a detected device, the application moves to a state 830.

In the state 830, the application establishes a set of connections (e.g., one bidirectional connection or two opposite-direction, unidirectional connections) to connect to the main device that provides the service that was selected. In some embodiments, the application establishes the connections in a similar manner that is described above by reference to FIG. 4. While in the state 830, the application is synchronizing with the UI control that is provided by the main device to which the application is connected. When the application receives a message indicating a puck movement, the application transitions to state 840. When the application receives input for a puck movement, the application changes to state 850.

In some cases, while the application is in the state 830, the connection with the main device may fail (e.g., the network through which the application was communicating failed, the main device or application running on the main device failed, etc.). In some embodiments, the application detects that the connection is lost after a defined number of keep-alive messages have not been received, after a defined amount of time of not receiving a keep-alive message, etc. When the application determines that the connection is lost, the application closes the connection and returns to the disconnected state 810.

At the state 840, the application processes the message to identify the puck that has been moved and the new location of the puck. In some embodiments, the application may translate the location into a coordinate system that is used by the application. After identifying the puck and the location of the puck, the application identifies the corresponding puck in the UI control that is provided by the application and moves the corresponding puck to the new location in the UI control provided by the application. After the application has moved the corresponding puck, the application transitions back to the state 830 to continue maintaining synchronization with the UI control that is provided by the main device to which the application is connected.

In the state 850, the application identifies, based on received input (e.g., touch input operation), the puck of the UI control that is provided by the application and the new location of the puck. In response to the input, the application moves the identified puck to the new location in the UI control. Once the application has moved the puck, the application moves to the state 860 to send a message, which specifies the identification of the puck and the new location of the puck, to the main device to which the application is connected in order to synchronize the UI control provided by the application with the UI control on the main device.

Figure 9:
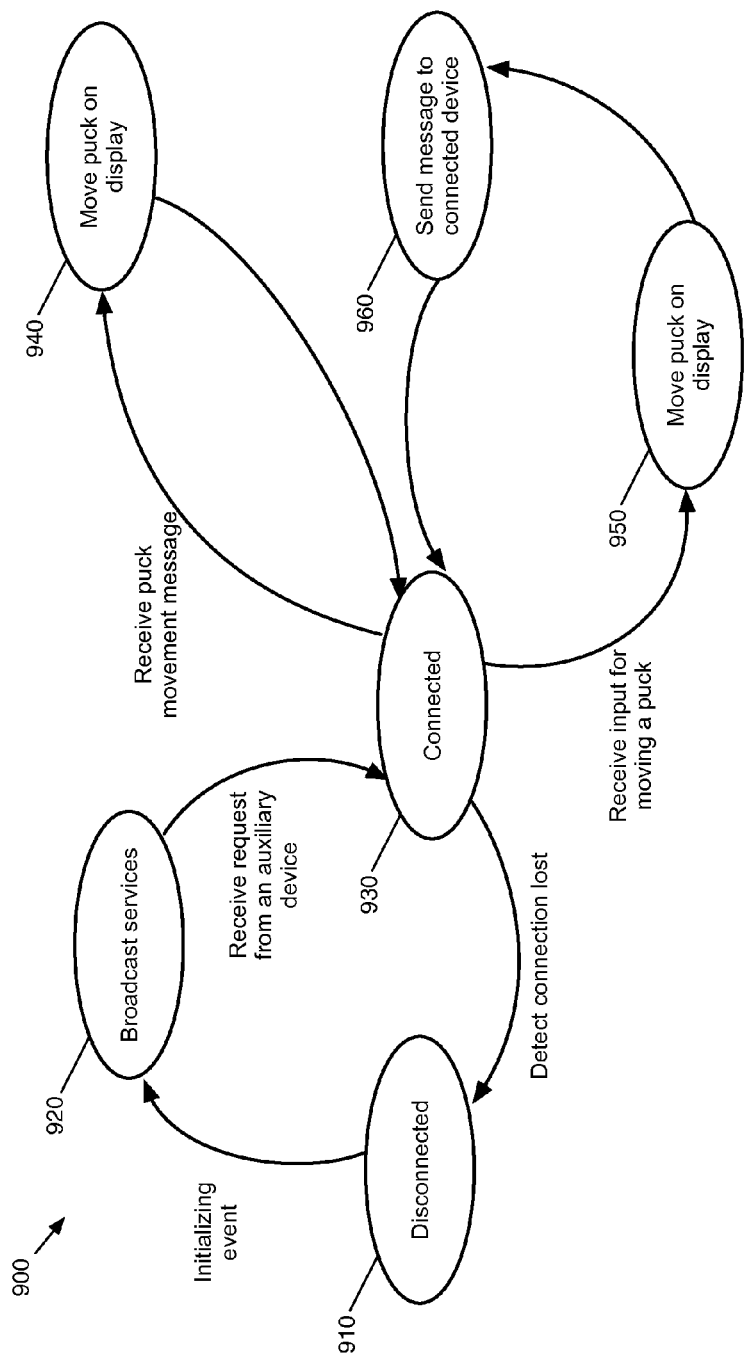
FIG. 9 conceptually illustrates a state diagram of a media editing application of some embodiments that provides a UI control for syncing with a UI control provided on an auxiliary device.

FIG. 9 conceptually illustrates a state diagram 900 of a media editing application of some embodiments that provides a color correction control for syncing with a UI control provided on an auxiliary device. Specifically, FIG. 9 illustrates several states of the media editing application of some embodiments and transitions between these states.

In state 910, the application is in a disconnected state. That is, the media editing application is not connected to an application on an auxiliary device. The media editing application of some embodiments starts in the state 910 when the media editing application is started. When the media editing application is in the state 910, the media editing application of some embodiments is handling other functions and tasks related to the creation of a composite presentation (e.g., compositing media items for a composite presentation, editing media items, applying effects to media items, etc.).

When the media editing application receives an initializing event, the media editing application transitions to state 920. In some embodiments, the initializing event is the start of the media editing application. In other words, the media editing application immediately transitions to the state 920 upon the invocation of the media editing application. The initializing event in some embodiments is the invocation of the color correction control.

At the state 920, the media editing application is broadcasting a set of services on a network (e.g., a single broadcast domain network). In some embodiments, the set of services includes services for providing connectivity to the color correction control provided by the media editing application. For each service in the set of services, the media editing application of some embodiments broadcasts the hostname of the main device on which the media editing application is running, a service name, and a service type. When the media editing application receives a request from an auxiliary device, the media editing application changes to state 930.

In the state 930, the media editing application establishes a set of connections (e.g., one bidirectional connection or two opposite-direction, unidirectional connections) to connect to an auxiliary device that provides a UI control for interacting with the media editing application. The media editing application of some embodiments establishes the connections in a similar manner that is described above by reference to FIG. 3. While in the state 930, the media editing application is synchronizing with the UI control that is provided by the auxiliary device to which the media editing application is connected. When the media editing application receives a message indicating a puck movement, the media editing application moves to state 940. When the media editing application receives input for a puck movement, the media editing application transitions to state 950.

While the media editing application is in the state 930, the connection with the auxiliary device may fail (e.g., the network through which the media editing application was communicating failed, the auxiliary device or application running on the auxiliary device failed, etc.). In some embodiments, the application detects that the connection is lost after a defined number of keep-alive messages have not been received, after a defined amount of time of not receiving a keep-alive message, etc. When the application determines that the connection is lost, the application closes the connection and returns to the disconnected state 910.

At the state 940, the media editing application processes the message to identify the puck that has been moved and the new location of the puck. The media editing application of some embodiments may translate the location into a coordinate system that is used by the media editing application. After identifying the puck and the location of the puck, the media editing application identifies the corresponding puck in the color correction control that is provided by the media editing application and moves the corresponding puck to the new location in the color correction control. After the media editing application has moved the corresponding puck, the media editing application transitions back to the state 930 to continue maintaining synchronization with the UI control that is provided by the auxiliary device to which the media editing application is connected.

In the state 950, the media editing application identifies, based on received input (e.g., a cursor control operation), the puck of the color correction control that is provided by the media editing application and the new location of the puck. In response to the input, the media editing application moves the identified puck to the new location in the color correction control. Once the media editing application has moved the puck, the application moves to the state 960 to send a message specifying the identification of the puck and the new location of the puck to the auxiliary device to which the media editing application is connected in order to synchronize the color correction control with the UI control on the auxiliary device.

The state diagrams illustrated in FIGS. 8 and 9 show several different states of the respective application. One of ordinary skill in the art will recognize that the various actions represented by the states and transitions in FIGS. 8 and 9 are only a subset of the possible actions that can be performed in the respective applications, in some embodiments. Additionally, other functions that are not shown may be performed while in a particular state. For instance, in some embodiments, when the media editing application is in a connected state, the media editing application may still broadcast services so that other auxiliary devices may connect in order to allow multiple auxiliary devices to connect to the color correction control of the media editing application.

III. Example UI Control Operations

This section will describe several different example operations that may be performed on a UI control provided on an auxiliary device. Many of the examples described below show only an auxiliary device for the purposes of explanation and simplicity. However, one of ordinary skill in the art will realize that the operations in these examples are performed while the UI control is connected with a media editing application. Hence, the synchronization techniques described above are also being used to synchronize the UI control with the media editing application.

A. Multi-touch

Several of the figures and embodiments described above illustrate moving one slider of a UI control provided on an auxiliary device (e.g., the UI control 122) at a time. In some embodiments, the UI control may be used to simultaneously move several UI sliders.

Figure 10:
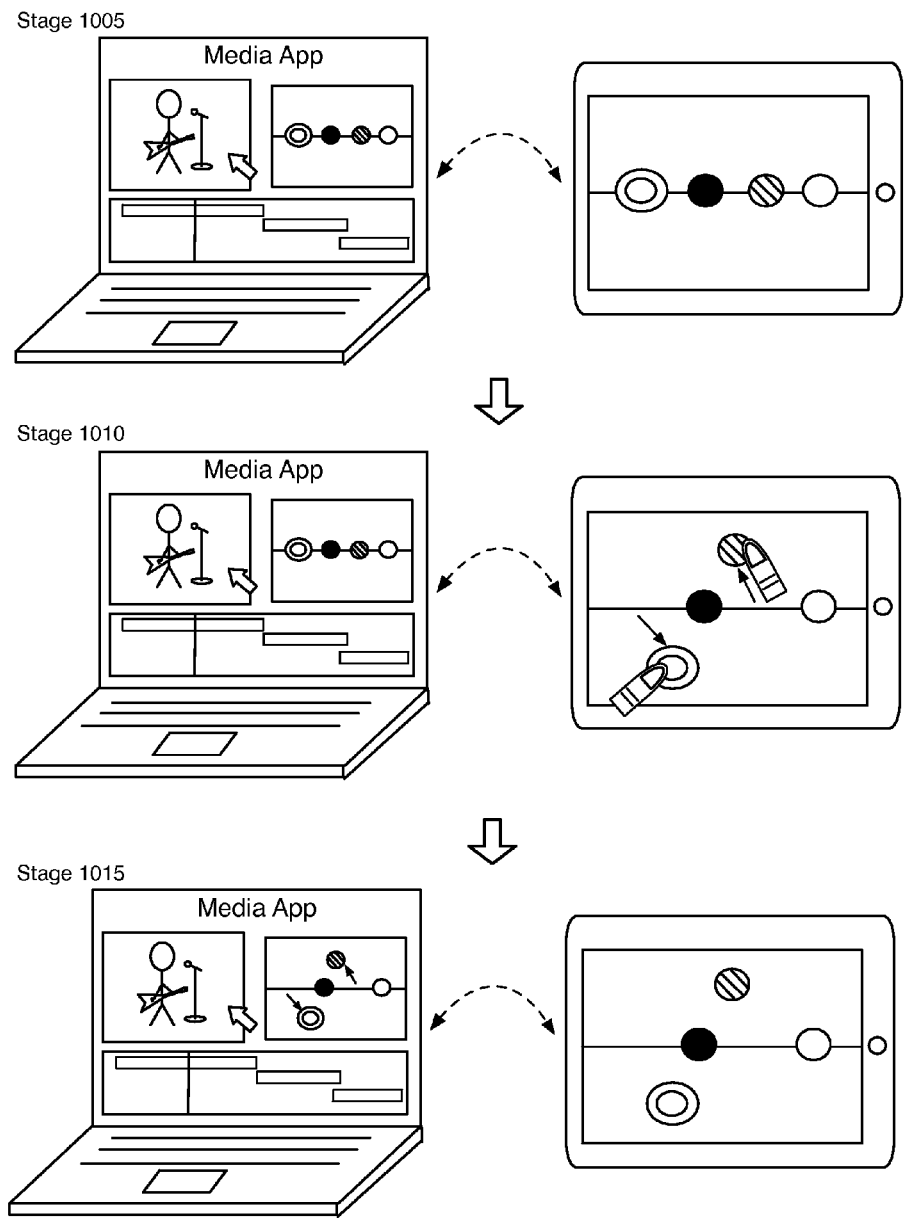
FIG. 10 conceptually illustrates a multi-touch feature of a UI control of some embodiments.

FIG. 10 conceptually illustrates a multi-touch feature of a UI control of some embodiments. Specifically, FIG. 10 illustrates the UI control 122 at three different stages 1005-1015 that shows an example of simultaneously moving several sliders of the UI control 122 to perform color correction operations.

The first stage 1005 shows the media editing application 180 and the UI control 122 at the same stage as the first stage 105 that is described above by reference to FIG. 1. That is, the sliders 160-175 are positioned on a horizontal line near the middle of the sliding region 154 of the color correction control 152, and the corresponding sliders 130-145 of the UI control 122 are positioned on a horizontal line near the middle of the sliding region 124.

The second stage 1010 illustrates an example of performing a multi-touch operation on the UI control 122 to perform simultaneous color correction operations in the media editing application 180. As shown, two fingers each provide touch input (e.g., by touching the touchscreen and dragging across the touchscreen) to simultaneously move the slider 130 down and towards the right and slider 140 up and towards the left, as indicated by arrows.

The third stage 1015 shows the color correction control 152 after the media editing application has synchronized the position of the sliders 160-175 with the position of the sliders of the UI control 122. In response to the movement of the sliders 130 and 140 in the second stage 1010, the media editing application 180 has performed corresponding movements of the sliders 160 and 170 in the color correction control 152 in order to synchronize the color correction control 152 with the UI control 122.

In some embodiments, the technique to synchronize multi-touch operations performed on the UI control 122 with the color correction control 152 is similar to the technique described above by reference to FIGS. 5 and 6. That is, upon the completion of the touch input of the multi-touch operation, the application that provides the UI control 180 identifies each of the sliders that was moved (i.e., sliders 130 and 140 in this example), identifies the new location of each slider, and generates a message for each slider that specifies the identification of the slider and the new location of the slider. When the media editing application 180 receives the messages, the media editing application 180 uses the messages to synchronize the color correction control 152 with the UI control 122. In some embodiments, the application that provides the UI control 122 may send a single message that specifies the identification of each of the sliders that has moved and the new location of each of the sliders instead of sending a message for each slider.

B. Fine Adjustment

In some cases, using touch input to move sliders in the UI control may not allow for precise adjustment of the position of the sliders (e.g., due to the size of the touchscreen). As such, the UI control of some embodiments provides a method to perform fine adjustments to the position of the sliders.

Figure 11:
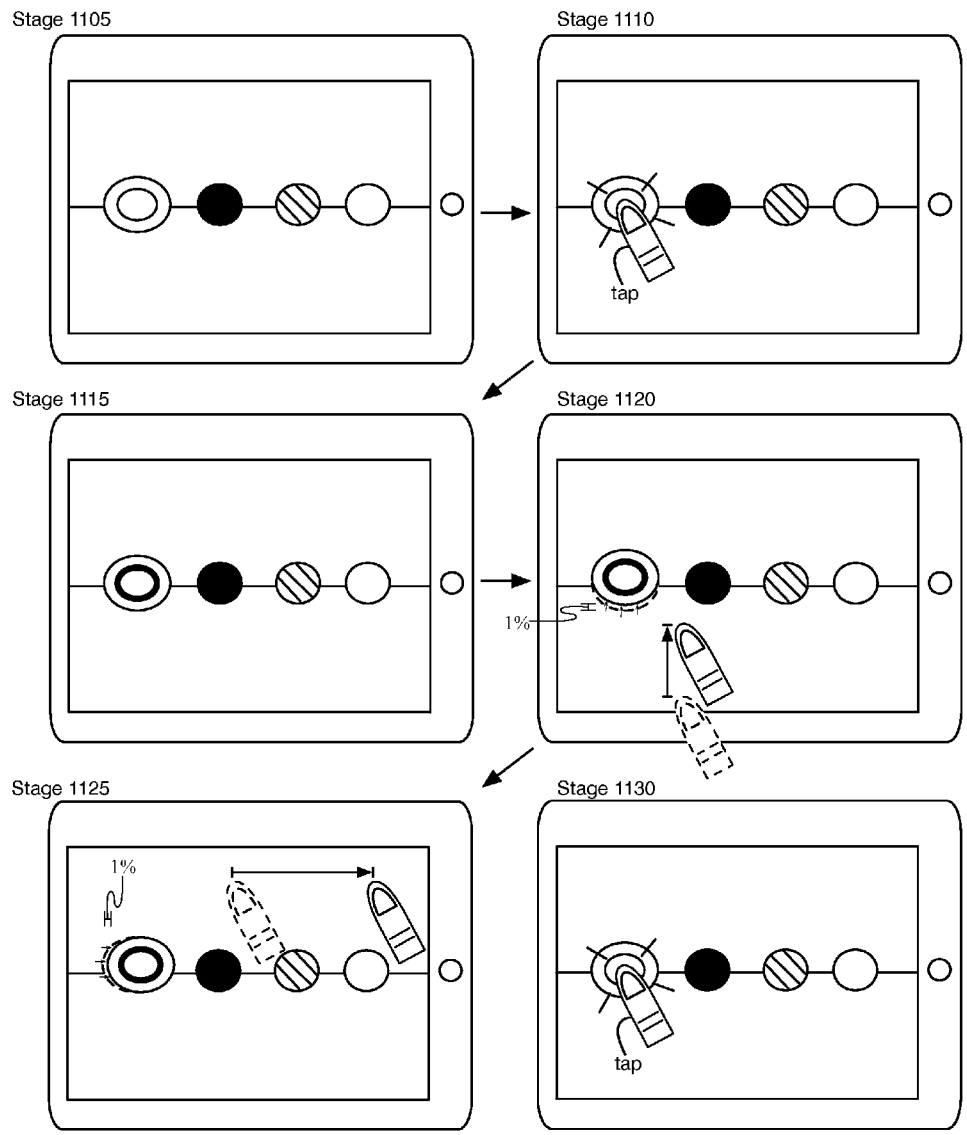
FIG. 11 conceptually illustrates a fine adjustment feature of a UI control of some embodiments.

FIG. 11 conceptually illustrates a fine adjustment feature of a UI control of some embodiments. This figure illustrates the UI control 122 at six different stages 1105-1130 of several fine adjustment operations. The first stage 1105 shows the UI control 122 in a similar state as the UI control 122 in the first stage 105 of FIG. 1. That is, the sliders 130-145 are positioned on a horizontal line near the middle of the sliding region 124 of the UI control 122.

At the second stage 1110, a fine adjustment mode is invoked. In this example, selecting a slider in the UI control 122 invokes the fine adjustment mode for the selected slider. As shown, a finger is providing touch input by tapping on the slider 130 to select the slider 130 and invoke the fine adjustment mode for the slider 130.

The third stage 1115 shows the UI control 122 after the fine adjustment mode for the slider 130 has been invoked. In this example, the UI control 122 bolds the inner circle of the slider 130 to indicate that the slider 130 is in the fine adjustment mode. Different embodiments may use different methods to indicate that a particular slider is in a fine adjustment mode (e.g., a textual notification, an animation, an aural notification, etc.)

Next, the fourth stage 1120 illustrates a fine adjustment operation. As shown in this stage, a finger has provided a gestural touch input by swiping the sliding region 124 of the UI control 122 in an up direction. When the UI control 122 receives the swipe input, the UI control 122 moves the slider 130 in the up direction. As indicated in the fourth stage 1120, the slider 130 is moved 1 percent of the total vertical distance of the sliding region 124. Different embodiments may use different percentages (e.g., 2 percent, 4 percent, 5 percent, etc.) for one fine adjustment increment.

For this example, the swipe input can be performed on any portion of the sliding region 124. That is, regardless of the location at which the swipe input is performed, the slider still moves the slider 130, 1 percent. In addition, in this example, swiping different distances moves the slider 130 the same amount. In other words, the swiping distance illustrated in the fourth stage 1120 moves the slider 130, 1 percent and a swiping input with a distance that is about the entire vertical distance of the UI control 122 moves the slider 130, 1 percent.

In some embodiments, the UI control 120 requires a threshold swipe input in order to move a slider an increment amount (e.g., 1 percent in this example). For instance, the UI control 122 of some embodiments may require the touch input to swipe a defined distance, a defined speed, a defined amount of time, a defined rate of speed, or any combination of swipe input thresholds.

The fifth stage 1125 illustrates another fine adjustment operation. As shown, a finger has provided a gestural touch input by swiping the sliding region 124 of the UI control 122 towards the right. When the UI control 122 receives the swipe input, the UI control 122 moves the slider 130 towards the right. As indicated in the fifth stage 1125, the slider 130 is moved 1 percent of the total horizontal distance of the sliding region 124. The fifth stage 1125 also shows swiping input that is performed on a different portion of the sliding region 124 in order to perform a fine adjustment. As noted above, different embodiments may use different percentages (e.g., 2 percent, 4 percent, 5 percent, etc.) for one fine adjustment increment.

In the sixth stage 1130 the fine adjustment mode for the slider 130 is exited. For this example, selecting the slider 130 in a similar manner as that used to invoke the fine adjustment mode for the slider 130 in the second stage 1110 is used to exit the fine adjustment mode. As shown, a finger is providing touch input by tapping on the slider 130 to select the slider 130 and exit the fine adjustment mode for the slider 130. In this example, the UI control 122 removes the bolding of the inner circle of the slider 130 to revert the appearance of the slider 130 to its appearance in the first stage 1105. This indicates that the slider 130 is not in the fine adjustment mode.

The FIG. 11 illustrates a fine adjustment in the up direction and a fine adjustment towards the right. However, these fine adjustments are exemplary and only shown for the purpose of explanation. One of ordinary skill in the art will realize that the fine adjustment feature allows for the fine adjustment of sliders in any direction. In addition, this figure shows that a particular gestural input (i.e., a swipe input) is used to perform fine adjustments to the position of sliders. Additional and/or other types of gestural input may be used in some embodiments. Moreover, other embodiments may use additional and/or different types of input to perform fine adjustments. For example, upon the invocation of the fine adjustment mode for a particular slider, the UI control of some embodiments may display a set of selectable directional items (e.g., arrow keys) that, when selected, moves the particular slider in the direction associated with the directional item. Also, the examples in FIG. 11 illustrate performing fine adjustments based on a percentage amount of the sliding region. However, one of ordinary skill in the art will recognize that the fine adjustment may be based on other metrics. For instance, each fine adjustment may adjust a slider a defined amount of pixels, a defined distance, etc.

C. Numeric Entry

The above figure illustrates a feature that allows for precise placement of sliders in a UI control. The following figure illustrates another feature that allows for precise placement of sliders in a UI control.

Figure 12:
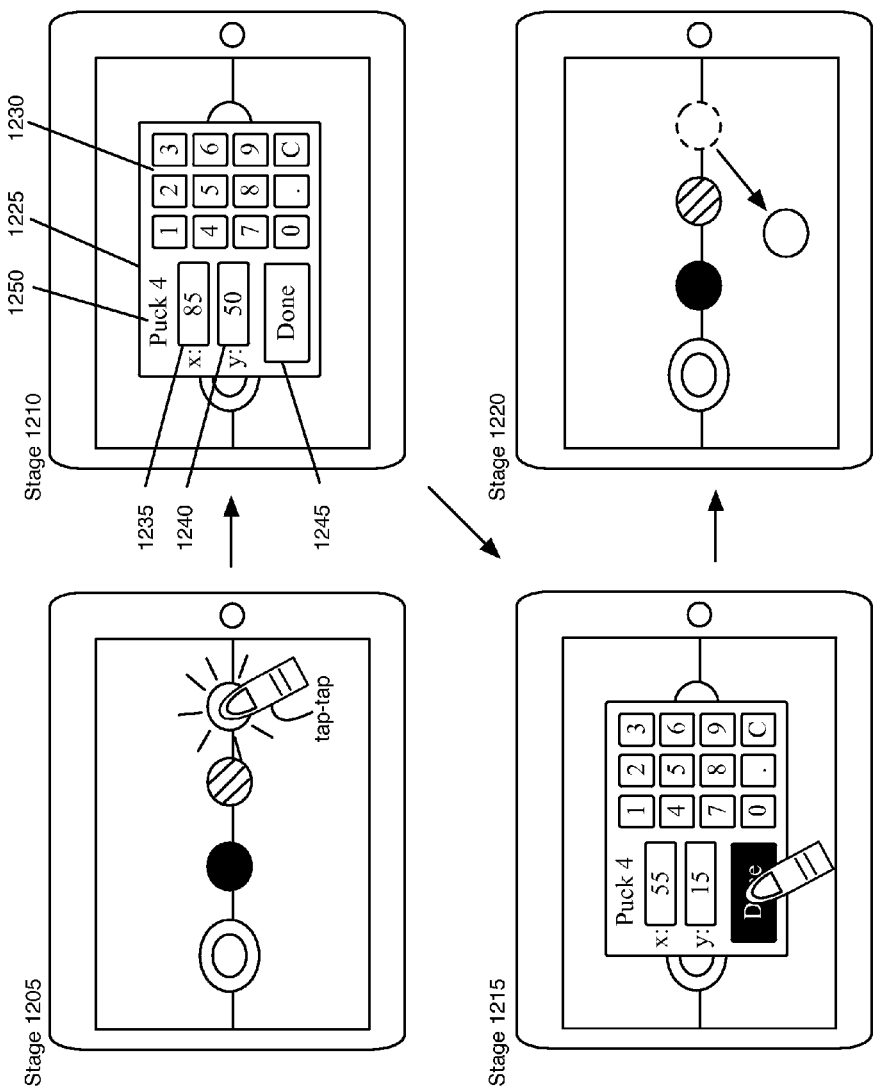
FIG. 12 conceptually illustrates a numeric input feature of a UI control of some embodiments.

FIG. 12 conceptually illustrates a numeric input feature of a UI control of some embodiments. In particular, this figure illustrates the UI control 122 at four different stages 1205-1220. The first stage 1205 shows the UI control 122 in a similar state as the UI control 122 in the first stage 105 of FIG. 1. That is, the sliders 130-145 are positioned on a horizontal line near the middle of the sliding region 124 of the UI control 122.

The first stage 1205 additionally shows the selection of a slider in the UI control 122 to invoke the numeric entry feature for the selected slider. As shown, a finger is providing touch input by double-tapping on the slider 145 to select the slider 145 and invoke the numeric entry feature for the slider 145.

The second stage 1210 illustrates the UI control 122 after the numeric entry feature has been invoked for the slider 145. As shown, a display window 1225 for specifying values for the position of a slider is displayed in this stage. In some embodiments, the UI control 122 displays the display window 1225 when the UI control 122 receives input to invoke the numeric entry feature for the slider 145.

The display window 1225 includes a virtual numeric keypad 1230, selectable fields 1235 and 1240, a selectable UI item 1245, and a title bar 1250. The title bar 1250 displays the name of the slider for which the numeric entry feature has been invoked. As shown, the title bar 1250 displays "Puck 4", which corresponds to the name of the slider 145. The selectable fields 1235 and 1240 are for displaying the current values of the location of the slider 145 (i.e., 85 for the x-axis and 50 for the y-axis in this example) and for entering values for a new position of the slider 145. Specifically, the selectable field 1235 is for entering a value for an x-axis component of the position of the slider 145 and the selectable field 1240 is for entering a value for a y-axis component of the position of the slider 145. The virtual numeric keypad 1230 includes several selectable UI items for specifying a value associated with the selectable UI item. The selectable UI item 1245 is for exiting the numeric entry feature for the slider 145.

The third stage 1215 illustrates the display window 1225 after new values have been specified for the location of the slider 145. A value of 55 is specified for the x-axis component of the position of slider 145 by selecting the selectable field 1235 and using the virtual numeric keypad 1230 to enter the value. Similarly, a value of 15 is specified for the y-axis component of the position of slider 145 by selecting the selectable field 1240 and using the virtual numeric keypad 1230 to enter the value. The third stage 1215 also shows that the selectable UI item 1245 is selected, as indicated by a highlighting of the UI item 1245, in order to exit the numeric entry feature and move the slider 145 to the location specified by the selectable fields 1235 and 1240. As shown, a finger is providing touch input to select the UI item 1245 by touching the selectable UI item 1245.

The fourth stage 1220 shows the UI control 122 after the selectable UI item 1245 has been selected to exit the numeric entry feature for the slider 145. When the UI control 122 receives the selection of the selectable UI item 1245, the UI control 122 of some embodiments closes the display window 1225 (i.e., no longer displays) and moves the slider 145 to a location specified by the values in the selectable fields 1235 and 1240. As shown in this stage, the slider 145 has been moved to the location specified by the selectable fields 1235 and 1240 of the display window 1225 shown in the third stage 1215.

D. Direct Placement

Several of the figures above illustrate moving a slider in a UI control by touching the slider and dragging it to a desired location in the sliding region of the UI control. However, using this technique to move the slider large distances may be tedious. Thus, the UI control of some embodiments provides a direct placement feature for moving a slider.

Figure 13:
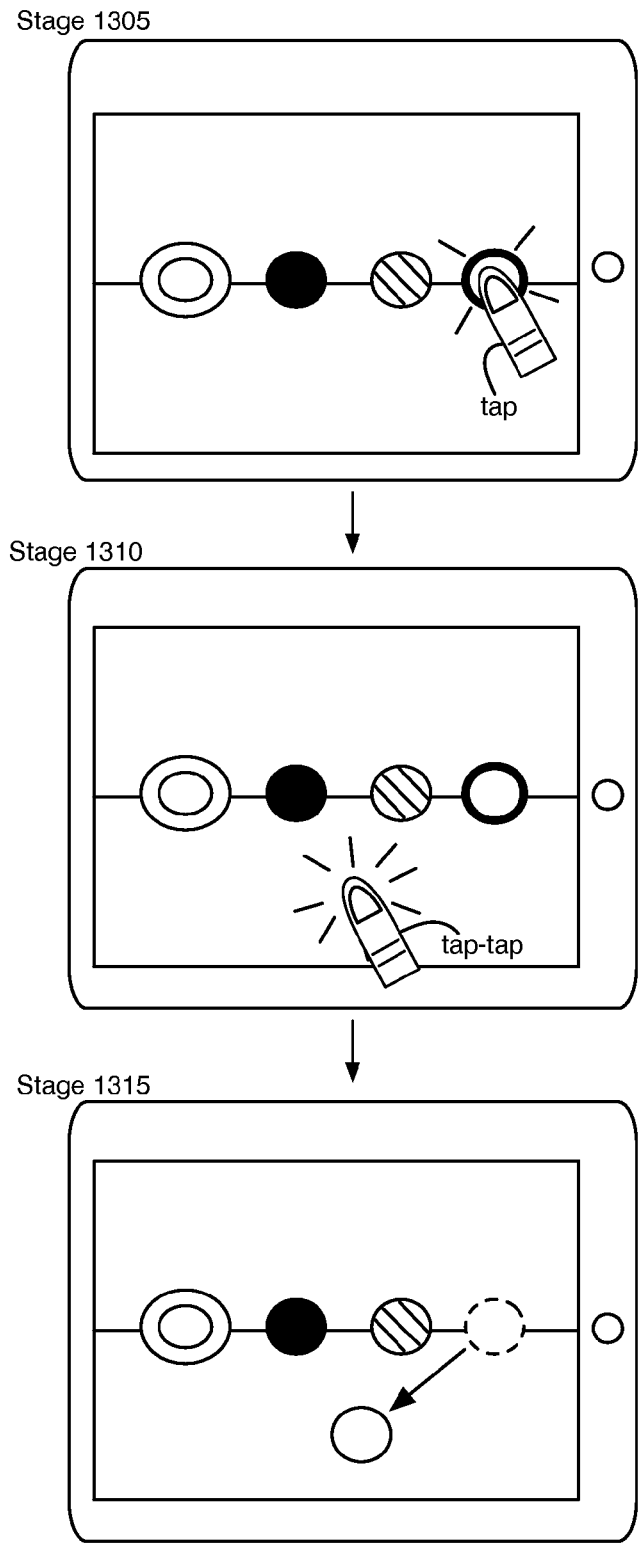
FIG. 13 conceptually illustrates a direct placement feature of a UI control of some embodiments.

FIG. 13 conceptually illustrates a direct placement feature of the UI control of some embodiments. In particular, FIG. 13 illustrates the UI control 122 at three different stages 1305-1315 of a direct placement operation. The first stage 1305 illustrates the UI control 122 in a similar state as the UI control 122 in the first stage 105 of FIG. 1. That is, the sliders 130-145 are positioned on a horizontal line near the middle of the sliding region 124 of the UI control 122.

Additionally, the first stage 1305 shows the invocation of the direct placement mode for a slider of the UI control 122. For this example, selecting a slider in the UI control 122 invokes the direct placement mode for the selected slider. As shown, a finger is providing touch input by tapping on the slider 145 to select the slider 145 and invoke the direct placement mode for the slider 145. In this example, the UI control 122 bolds the circle of the slider 145 to indicate that the slider 145 is in the direct placement mode. Different embodiments may use different methods to indicate that a particular slider is in a direct placement mode (e.g., a textual notification, an animation, an aural notification, etc.)

The second stage 1310 illustrates a direct placement operation. In some embodiments, a slider that is in the direct placement mode may be directly moved to a desired location by directly selecting the location. For this example, quickly tapping twice on a location in the sliding region 124 directly moves the slider to the location. As shown in this stage, a finger has provided a touch input by quickly tapping twice (e.g., double-tapping) on a location of the sliding region 124 of the UI control 122.

At the third stage 1315, the slider 145 has moved to the location in response to the selection of the location shown in the second stage 1310. When the UI control 122 receives the selection of the location (i.e., the double-tap in this example), the UI control 122 moves the slider 145 to the selected location in the sliding region 124, as indicated by an arrow.

The figure described above shows that a particular touch input (i.e., a double-tap input) is used to perform a direct placement operation to directly move the position of sliders. Additional and/or other types of touch input may be used in some embodiments. Also, other embodiments may use additional and/or different types of input (e.g., gestural input) to perform fine adjustments.

E. Reset Positions

As described above, some embodiments provide a default location for the sliders of the UI control. For instance, the positions of the sliders on a horizontal line near the middle of the sliding region of the UI control illustrated above are default positions in some embodiments. After moving some or all of the sliders in a UI control, the user of the UI control may wish to move the sliders back to their default locations.

Figure 14:
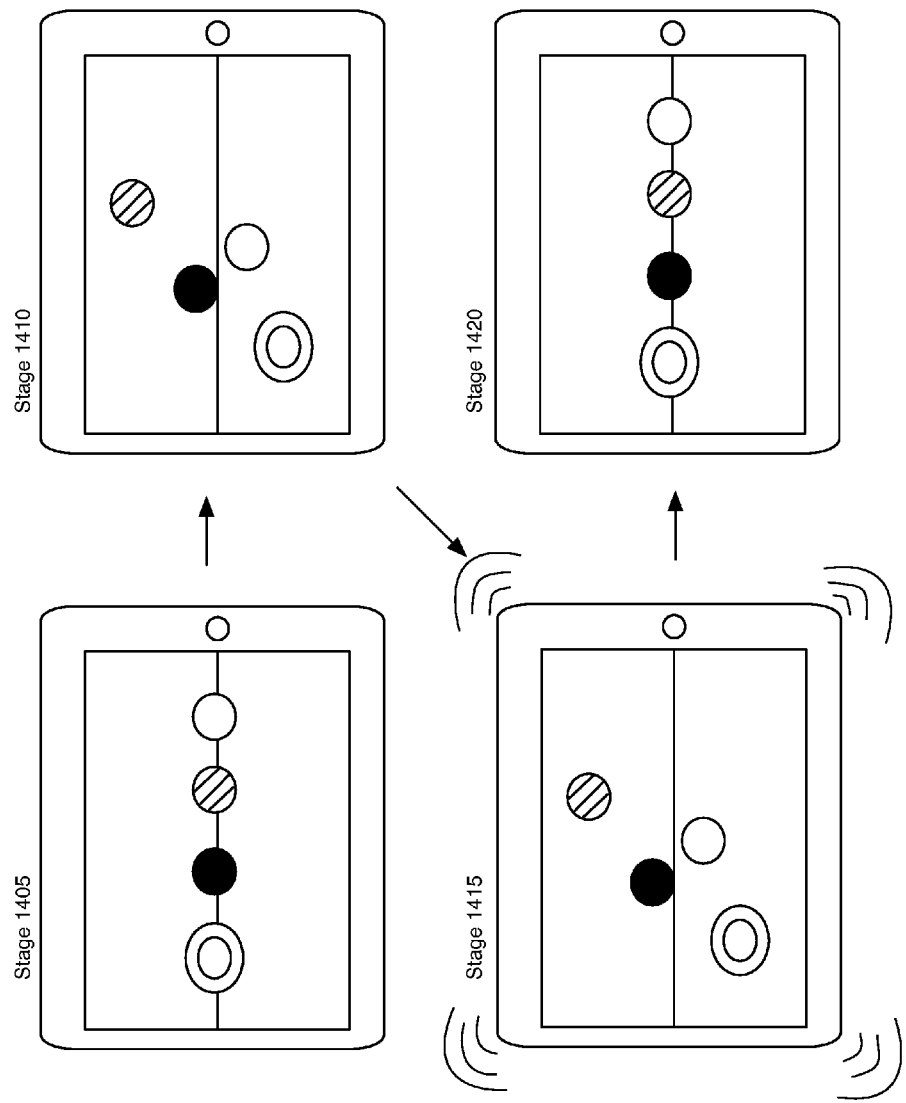
FIG. 14 conceptually illustrates a reset feature of the UI control of some embodiments.

FIG. 14 conceptually illustrates a reset feature of the UI control of some embodiments. Specifically, FIG. 14 illustrates the UI control 122 at four different stages 1405-1420 of a reset operation. The first stage 1405 illustrates the UI control 122 in a similar state as the UI control 122 in the first stage 105 of FIG. 1. That is, the sliders 130-145 are positioned on a horizontal line near the middle of the sliding region 124 of the UI control 122.

The second stage 1410 illustrates the UI control after the sliders 130-145 have been moved to various locations in the sliding region 124 of the UI control 122. Any of the techniques described above for moving sliders may be used to move the sliders 130-145.

At the third stage 1415, a reset operation is performed. The tablet 120 of some embodiments includes a sensor (e.g., an accelerometer) for sensing a shake gesture. In this example, a shake gesture is used to reset the positions of the sliders 130-145 to their default locations. As indicated, the tablet 120 is being shaken in order to invoke the reset operation to reset the positions of the sliders 130-145.

The fourth stage 1420 shows that the positions of the sliders 130-145 have been reset to their default locations. In some embodiments, when the UI control 122 receives the shake gesture input, the UI control 122 moves each of the sliders 130-145 to their respective default locations.

FIG. 14 illustrates that a particular gestural input (i.e., a shake input) is used to reset the positions of sliders to their default locations. Additional and/or other types of gestural input may be used in some embodiments. In addition, other embodiments may use additional and/or different types of input to reset the position of the sliders. For example, the UI control of some embodiments may provide a selectable UI item that, when selected, resets the positions of the sliders to their default locations.

While FIG. 14 shows an example of resetting all the sliders of a UI control to default locations, in some cases, the user may wish to reset only a few of the sliders of a UI control. Thus, the UI control of some embodiments provides an individual slider reset feature.

Figure 15:
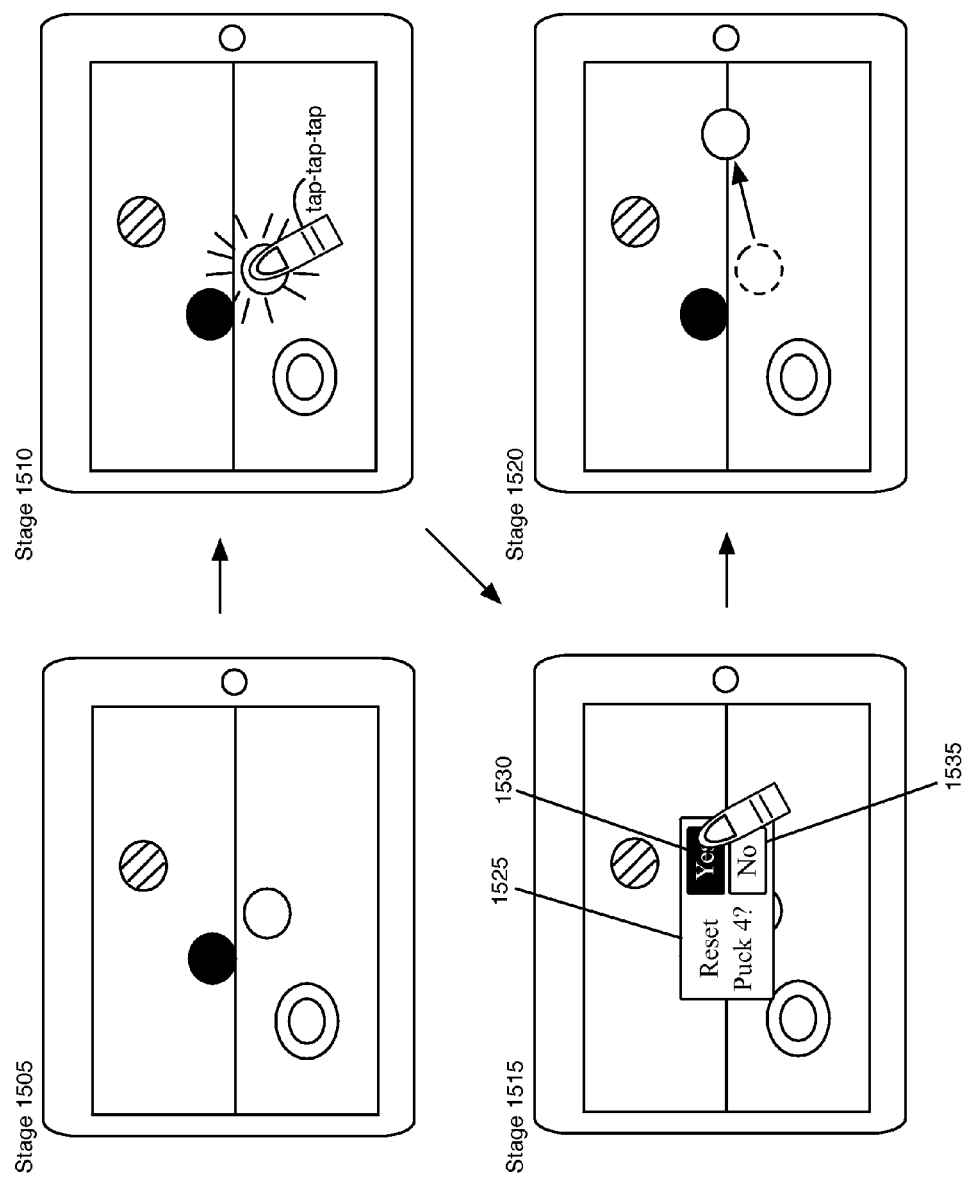
FIG. 15 conceptually illustrates an individual slider reset feature of a UI control of some embodiments FIG. 16 conceptually illustrates creating a preset for an arrangement of sliders of a UI control of some embodiments.

FIG. 15 conceptually illustrates an individual slider reset feature of a UI control of some embodiments. This figure illustrates the UI control 122 at four different stages 1505-1520 of an individual slider reset operations. At the first stage 1505, the UI control 122 is in the same state as the UI control 122 that is shown in the second stage 1410 of FIG. 14. That is, the sliders 130-145 have been moved to various locations in the sliding region 124 of the UI control 122 using any of the techniques described above for moving sliders.

The second stage 1510 shows the invocation of the individual slider reset feature. For this example, selecting a slider in the UI control 122 using a double-tap touch input invokes the individual slider reset feature for the particular slider. As shown in this stage, a finger is providing touch input by triple-tapping the slider 145 to select the slider 145 and invoke the individual slider reset feature for the slider 145.

The third stage 1515 illustrates the UI control 122 after the individual slider reset feature has been invoked for the slider 145. As shown, a display window 1525 for resetting the position of the slider 145 to its default location is displayed. In some embodiments, the UI control 122 displays the display window 1525 when the UI control 122 receives input to invoke the individual slider reset feature for the slider 145.

The display window 1525 includes selectable UI items 1530 and 1535. The selectable UI item 1530 is for resetting the position of the slider 145 to its default location. The selectable UI item 1535 is for canceling the individual slider reset operation for the slider 145 and maintaining the current position of the slider 145. The third stage 1515 also illustrates that the selectable UI item 1530 is selected, as indicated by a highlighting of the UI item 1530, in order to reset the position of the slider 145 to its default location. As shown, a finger is providing touch input by touching the selectable UI item 1535 in order to select the selectable UI item 1530 and reset the position of the slider 145 to its default location.

The fourth stage 1520 illustrate the UI control 122 after the position of the slider 145 has been reset to its default location. When the UI control 122 receives the selection of the selectable UI item 1530, the UI control 122 of some embodiments closes the display window 1525 (i.e., no longer displays) and moves the slider 145 back to its default location. As shown, the slider 145 has been moved to its default location, which is on the horizontal line that is near the middle of the sliding region 124 of the UI control 122.

F. Presets

Often, a particular arrangement of sliders of a UI control is repeatedly used or the user may like the particular effects produced by a particular arrangement of sliders and wish to save the particular arrangement. Therefore, some embodiments may provide a preset feature for saving arrangements of sliders of a UI control for later use.

Figure 16:
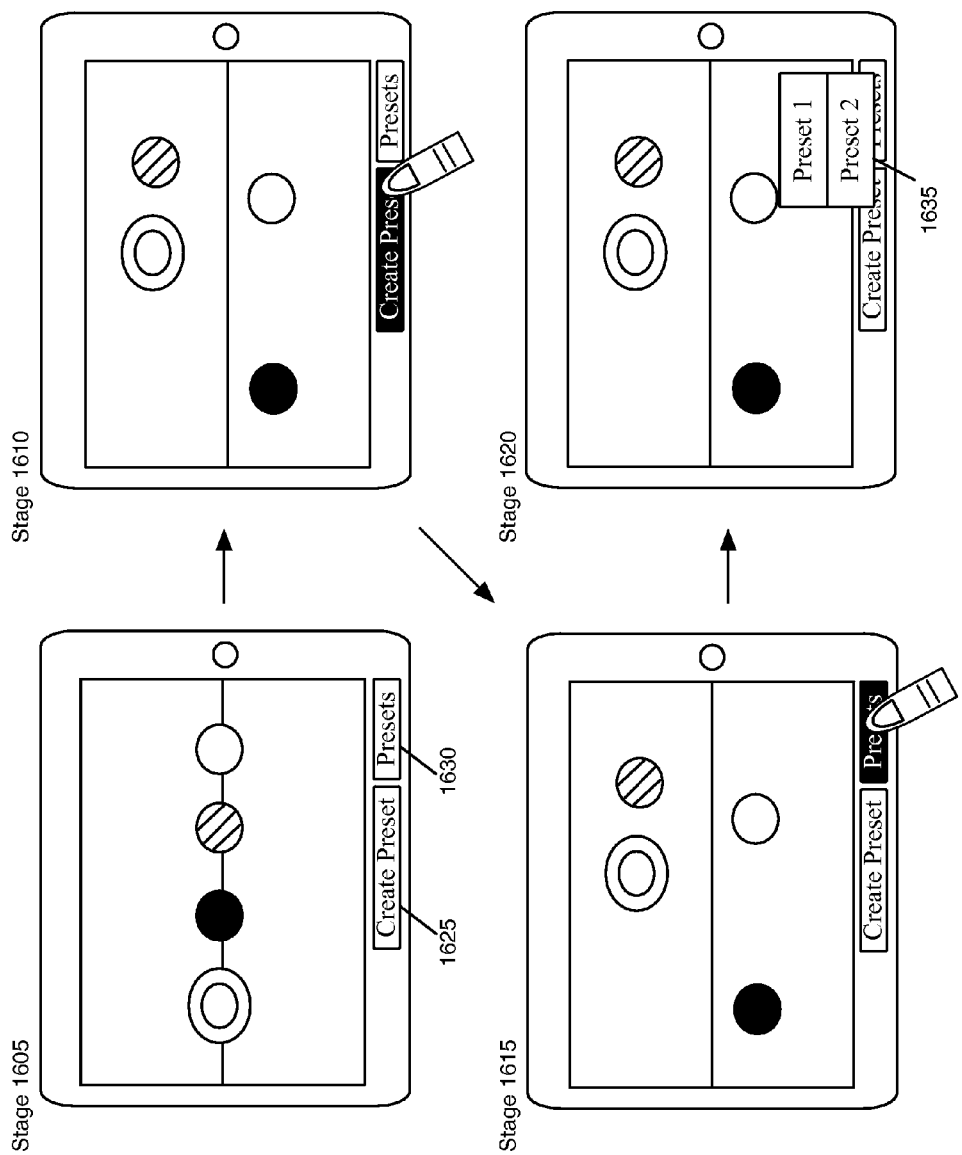

FIG. 16 conceptually illustrates creating a preset for an arrangement of sliders of a UI control of some embodiments. Specifically, FIG. 16 illustrates the UI control 122 at four different stages 1605-1620 of a preset creation operation. The first stage 1605 illustrates the UI control 122 in a similar state as the UI control 122 in the first stage 105 of FIG. 1. That is, the sliders 130-145 are positioned on a horizontal line near the middle of the sliding region 124 of the UI control 122. The first stage 1605 also shows that the UI control 122 includes selectable UI items 1625 and 1630. The selectable UI item 1625 is for creating a preset and the selectable UI item 1630 is for displaying a list of created presets.

The second stage 1610 illustrates the UI control after the sliders 130-145 have been moved to various locations in the sliding region 124 of the UI control 122. Any of the techniques described above for moving sliders may be used to move the sliders 130-145. The second stage 1610 also illustrates the invocation of the preset creation operation. In particular, this stage shows the selectable UI item 1625 is selected, as indicated by a highlighting of the UI item 1625, in order to invoke the preset creation operation. As shown, a finger is providing touch input by touching the selectable UI item 1625 to select the UI item 1625. In some embodiments, when the selectable UI item 1625 is selected, the UI control 122 saves the arrangement of the current positions of each of the sliders 130-145 and adds the arrangement to a list of created presets.

The third stage 1615 shows the UI control 122 after the preset creation operation has completed. This stage also illustrates the selection of the selectable UI item 1630, as indicated by a highlighting of the UI item 1630, to invoke the display of the list of created presets. As shown at the third stage 1615, a finger is providing touch input by touching the selectable UI item 1630 to select the UI item 1630.

At the fourth stage 1620, the UI control 122 is displaying a display window 1635 that includes a list of created presets. As shown, the list of presets includes two created presets. In some embodiments, a created preset is added to the end of the list of presets. In this example, a preset had previously been created before the preset created in the second stage 1610. Thus, "Preset 2" in the list of created presets corresponds to the preset created in the second stage 1610. While FIG. 16 shows the UI control 122 automatically providing a preset name, the UI control 122 of some embodiments may provide a way (e.g., displaying a pop-up menu that includes a UI text input field) to specify a name for a preset.

Figure 17:
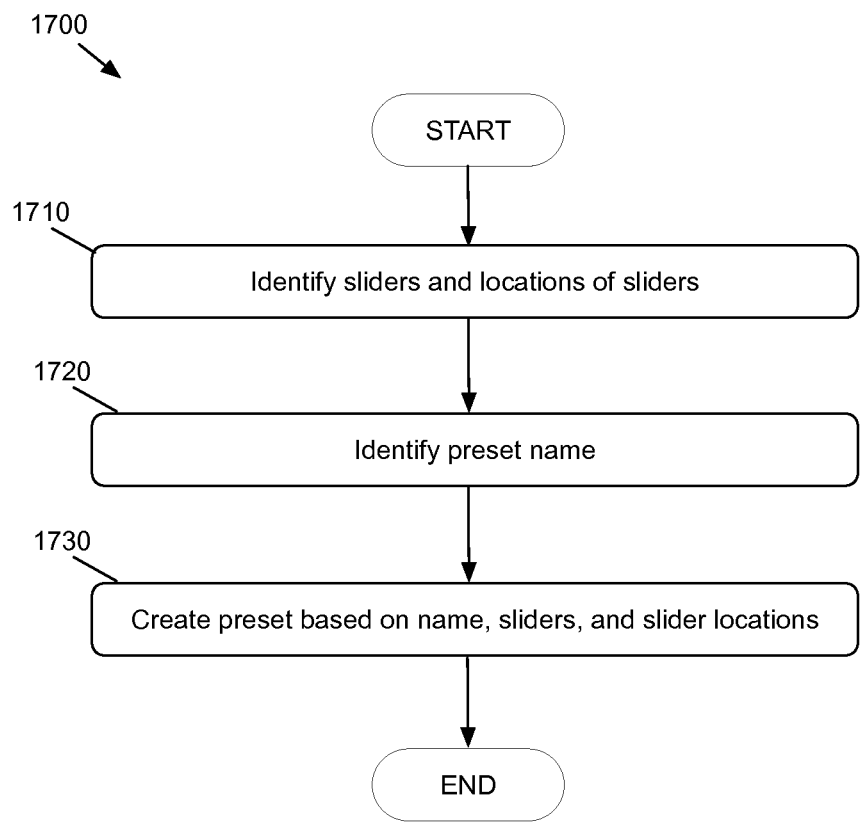
FIG. 17 conceptually illustrates a process of some embodiments for creating a preset.

FIG. 17 conceptually illustrates a process 1700 of some embodiments for creating a preset. In some embodiments, the process 1700 is performed by the UI control 122 when a preset creation operation is invoked (e.g., when the UI control 122 receives selection of the selectable UI item 1625). The process 1700 starts by identifying (at 1710) each slider and the location of the slider in the sliding region 124 of the UI control 122.

Next, the process 1700 identifies (at 1720) a preset name for the preset. In some embodiments, the UI control 122 automatically generates the preset name. The UI control 122 of some embodiments provides a display window for specifying the preset name.

Finally, the process 1700 creates (at 1730) a preset based on the identified preset name, the identification of the sliders, and the locations of the sliders. In some embodiments, the process 1700 creates the preset by (1) associating the preset name with the sliders and the slider locations and (2) storing the preset in a storage.

FIGS. 16 and 17 illustrate creating presets using a UI control on an auxiliary device. In some embodiments, the presets are synchronized between the UI control and a color correction control of a media editing application. The UI control of some such embodiments synchronizes presets with a media editing application using a technique that is similar to the technique used to synchronize sliders of a UI control with the sliders of a color correction control of the media editing application, which is described above by reference to FIG. 7. However, in such embodiments, the message that is sent for synchronizing each preset includes the preset name along with the identification of each of the sliders and the locations of the sliders. Additionally, in some embodiments, the media editing application provides a color correction control that allows for the creation of preset in a similar manner described above by reference to FIGS. 16 and 17. The presets created using such a color correction control may be synchronized using the technique described above by reference to FIG. 7, in some embodiments.

Figure 18:
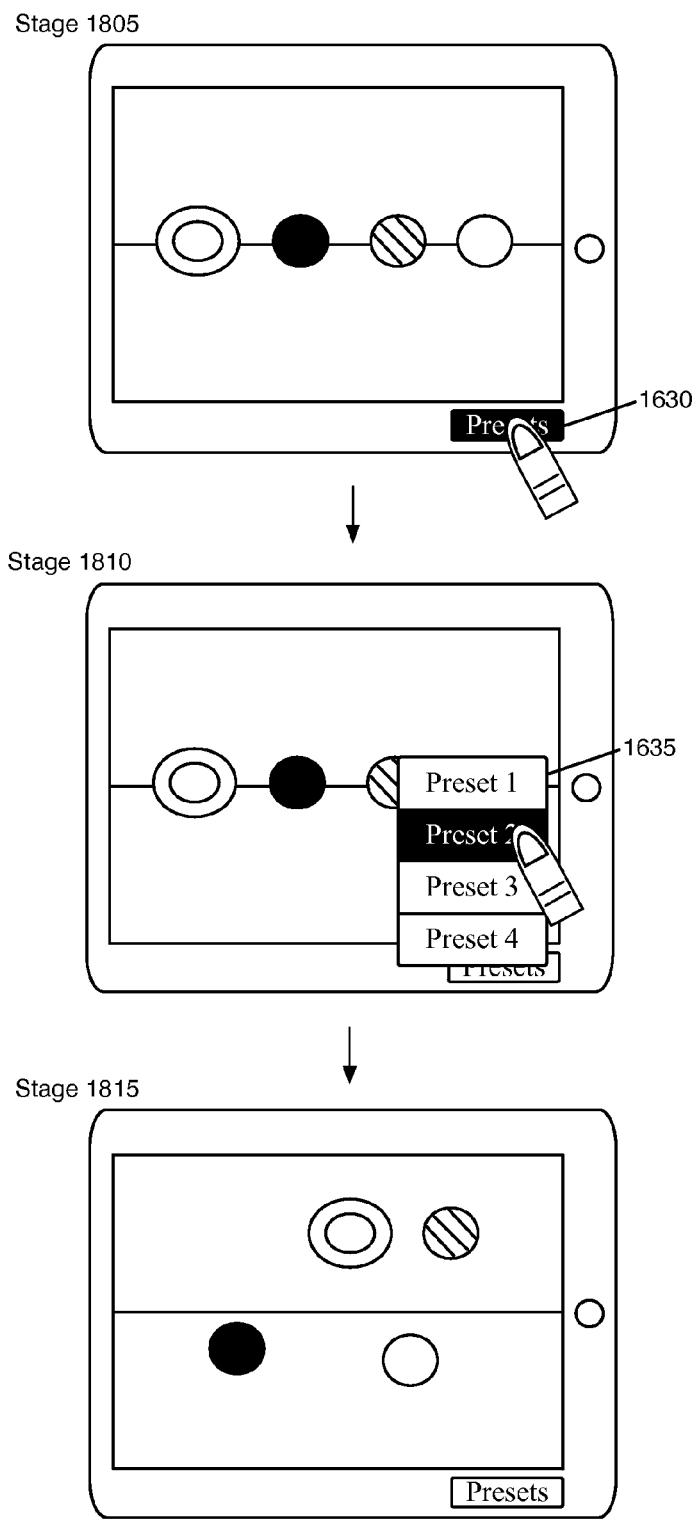
FIG. 18 conceptually illustrates using a preset to automatically arrange sliders of a UI control of some embodiments.

FIG. 18 conceptually illustrates using a preset to automatically arrange sliders of a UI control of some embodiments. In particular, FIG. 18 illustrates the UI control 122 at three different stages 1805-1815 of a preset operation. The first stage 1805 shows the UI control 122 in a similar state as the UI control 122 in the first stage 105 of FIG. 1. That is, the sliders 130-145 are positioned on a horizontal line near the middle of the sliding region 124 of the UI control 122. The first stage 1805 also shows a finger is providing touch input by tapping on the selectable UI item 1630, as indicated by a highlighting of the UI item 1630, to select the UI item 1630 and invoke the display of the list of created presets.

The second stage 1810 illustrates the UI control 122 displaying the display window 1635 that includes a list of created presets. At this stage, the list of presets includes four selectable UI items that correspond to four created presets. "Preset 2" in the list of created presets corresponds to the preset created in FIG. 16. The second stage 1810 also shows that the finger is providing touch input by tapping on the selectable UI item that corresponds to "Preset 2" to select the preset that corresponds to "Preset 2". The selection is indicated by a highlighting of the UI item.

The third stage 1815 shows the UI control 122 after the selection of the "Preset 2" selectable UI item. In some embodiments, when the UI control 122 receives a selection of a selectable UI item that corresponds to a preset, the UI control 122 moves the sliders 130-145 to the positions defined by the preset. As shown, the UI control 122 has moved each of the sliders 130-145 to the positions defined by the "Preset 2" that was created in FIG. 16.

In some instances, the media editing application of some embodiments provides a feature to create, edit, and/or delete a color correction layer. In some embodiments, a color correction layer specifies a set of color correction operations that are defined by the positions of the sliders in the sliding region of a UI control. The user of the media editing application may select (e.g., enable) some or all of the color correction layers to apply to a media item. In addition, the user of the media editing application may select (e.g., disable) some or all of the color correction layers to not apply to a media item. When several color correction layers are select to be applied to a media item, the media editing application of some embodiments aggregates the effects of each color correction layer to the media item.

Figure 19:
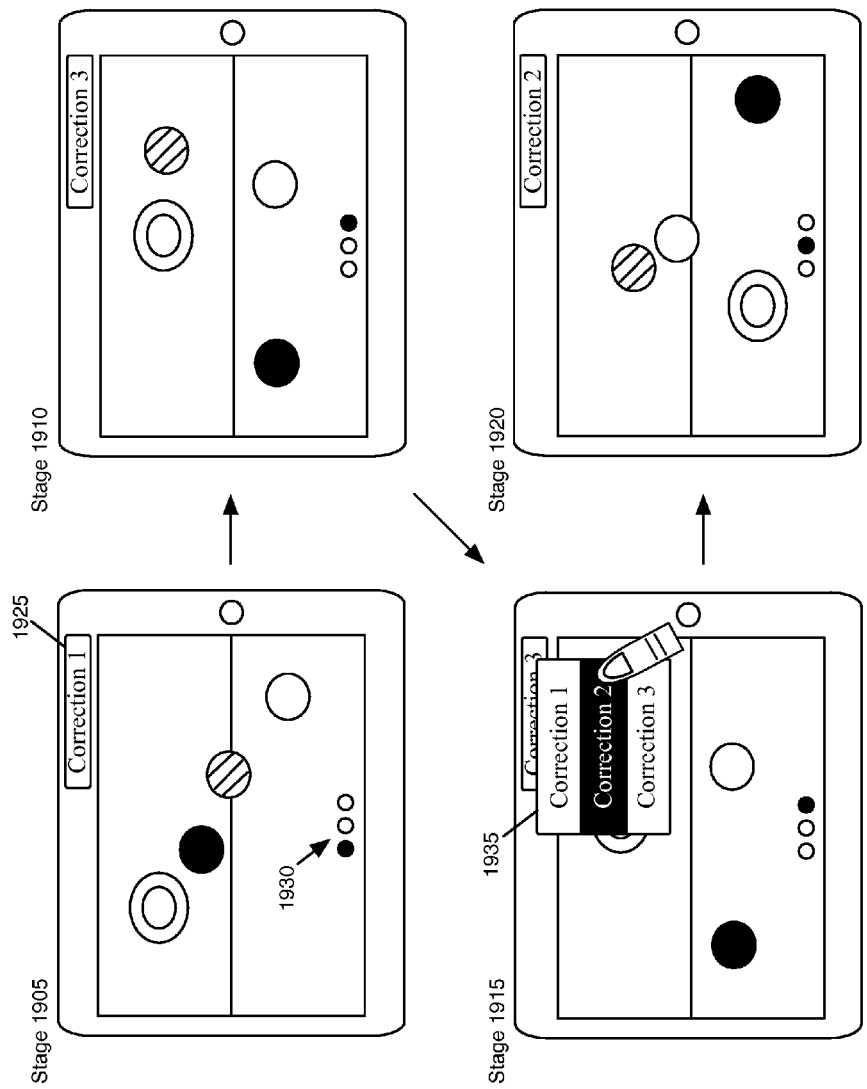
FIG. 19 conceptually illustrates a color correction layer feature of the UI control of some embodiments.

FIG. 19 conceptually illustrates a color correction layer feature of the UI control of some embodiments. Specifically, FIG. 19 illustrates the UI control 22 at four different stages 1905-1920 of switching among several color correction layers. The first stage 1905 shows that the UI control 122 includes a selectable UI item 1925 and a set of color correction layer indicators 1930. The selectable UI item 1925 is for switching among three color correction layers 1-3. The set of color correction layer indicators 1930 is for indicating the current number of available color correction layers (three in this example) and for indicating the color correction layer that is displayed in the UI control 122. In this example, the left dot in the set of color correction layer indicators 1930 represents a color correction layer "Correction 1", the middle dot in the set of color correction layer indicators 1930 represents a color correction layer "Correction 2", and the right dot in the set of color correction layer indicators 1930 represents a color correction layer "Correction 3".

In some embodiments, the set of color correction layer indicators 1930 is also for switching among the three color correction layers. For example, in some such embodiments, selecting (e.g., by touching the touchscreen) the area near the right of the set of color correction layer indicators 1930 switches the color correction layer displayed by the UI control 122 from "Correction 1" to "Correction 2" or from "Correction 2" to "Correction 3". Similarly, selecting (e.g., by touching the touchscreen) the area near the left of the set of color correction layer indicators 1930 witches the color correction layer displayed by the UI control 122 from "Correction 2" to "Correction 1" or from "Correction 3" to "Correction 2".

The first stage 1905 illustrates that the UI control 122 is displaying the color correction layer "Correction 1". Specifically, this stage shows the positions of the sliders 130-145 that define the color corrections associated with the color correction layer "Correction 1". The color correction layer "Correction 1" that is displayed in the UI control 122 is indicated by the bolding of the left dot in the set of color correction layer indicators 1930.

The second stage 1910 shows the UI control 122 displaying the color correction layer "Correction 3". In some embodiments, the UI control 122 displays the color correction layer "Correction 3" when the UI control 122 receives input that specifies the color correction layer "Correction 3". For instance, the UI control 122 displays the color correction layer "Correction 3" when the UI control 122 receives two taps in the area near the right of the set of color correction layer indicators 1930. In such case, the UI control 122 displays the color correction layer "Correction 2" when the UI control 122 receives the first tap and then displays the color correction layer "Correction 3" when the UI control 122 receives the second tap. As shown, the second stage 1910 shows the positions of the sliders 130-145 that define the color corrections associated with the color correction layer "Correction 3". The color correction layer "Correction 3" that is displayed in the UI control 122 is indicated by the bolding of the right dot in the set of color correction layer indicators 1930.

In the third stage 1915, the UI control 122 is displaying a display window 1935 that includes a set of selectable UI items that correspond to a set of color correction layers. As illustrated in the third stage 1915, the set includes three selectable UI items that correspond to three color correction layers. Additionally, the third stage 1915 shows that a finger is providing touch input by tapping on the selectable UI item "Correction 2" to select the UI item "Correction 2" and switch to the color correction layer that corresponds to "Correction 2".

The fourth stage 1920 illustrates the UI control 122 after the UI item "Correction 2" has been selected. As shown, the UI control 122 is displaying the color correction layer "Correction 2". In some embodiments, the UI control 122 displays the color correction layer "Correction 2" when the UI control 122 receives the selection of the UI item "Correction 2". The fourth stage 1920 shows the positions of the sliders 130-145 that define the color corrections associated with the color correction layer "Correction 2". The color correction layer "Correction 2" that is displayed in the UI control 122 is indicated by the bolding of the middle dot in the set of color correction layer indicators 1930.

The examples and embodiments of several features described in this section are illustrated in separate figures. However, one of ordinary skill in the art will realize that two or more of the features may be combined. For instance, the numeric entry feature and the individual slider reset feature may be combined into a single feature so that when a slider is selected (e.g., by double-tapping) to invoke the feature, the numeric entry and the individual slider reset features for the selected slider are displayed together in one display window. In addition, some of the features use the same or similar method to invoke the features. For example, the fine adjustment feature and the direct placement feature both use a single-tap to invoke the corresponding feature. One of ordinary skill in the art will realize that the different features may utilize different invocation methods to invoke the different features.

IV. Software Architecture

Figure 20:
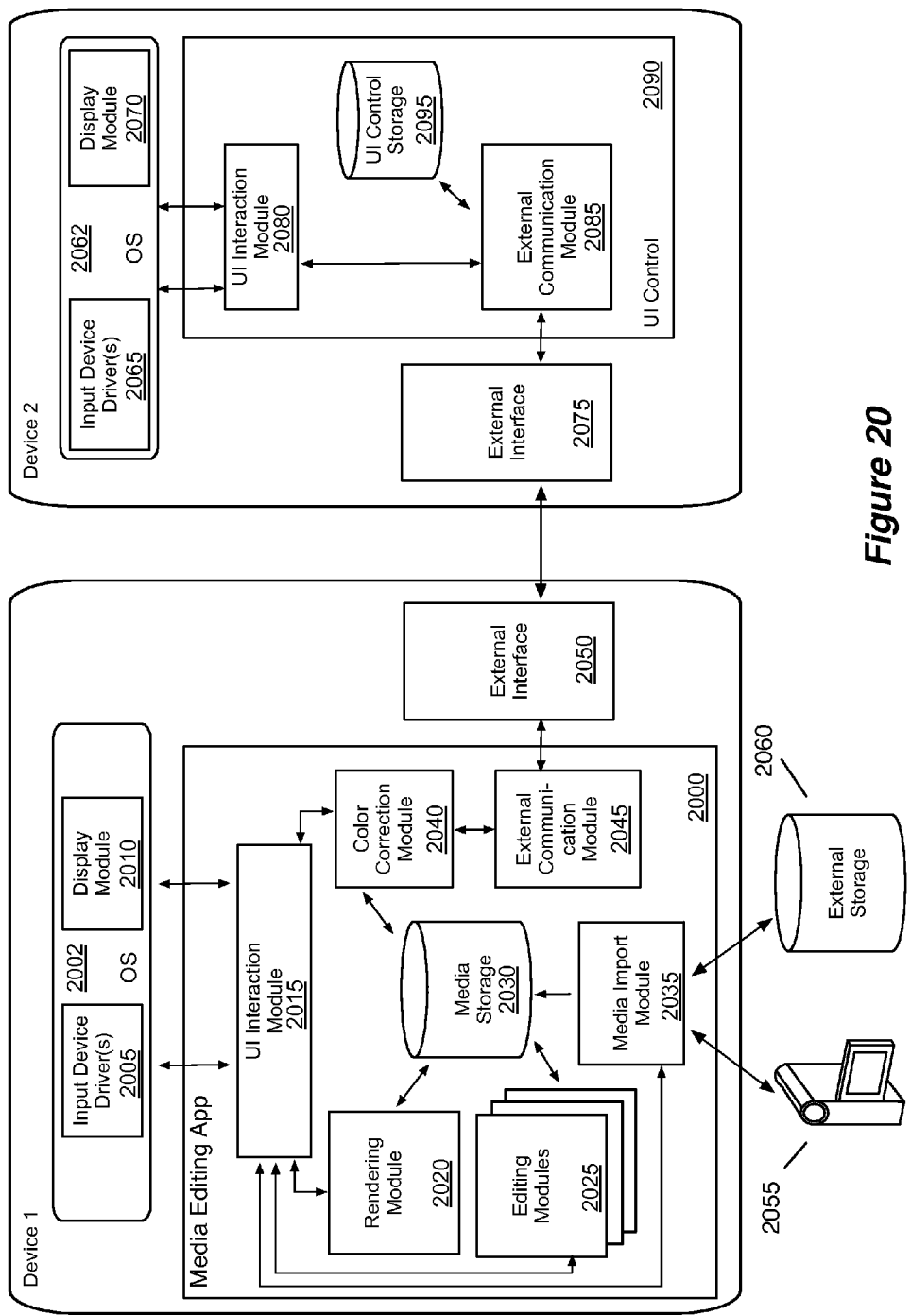
FIG. 20 conceptually illustrates a software architecture of a media editing application of some embodiments and a UI control of some embodiments.

In some embodiments, the processes described above are implemented as software running on a particular machine, such as a computer, a tablet, a handheld device, or stored in a machine readable medium. FIG. 20 conceptually illustrates a software architecture of a media editing application 2000 of some embodiments and a UI control 2090 of some embodiments.

In some embodiments, the media editing application 2000 is a stand-alone application or is integrated into another application (e.g., a compositing application), while in other embodiments the media editing application 2000 might be implemented within an operating system. Furthermore, in some embodiments, the media editing application 2000 is provided as part of a server-based solution. In some such embodiments, the media editing application 2000 is provided via a thin client. That is, the media editing application 2000 runs on a server while a user interacts with the media editing application 2000 via a separate machine remote from the server. In other such embodiments, the media editing application 2000 is provided via a thick client. That is, the media editing application 2000 is distributed from the server to the client machine and runs on the client machine.

As shown in FIG. 20, the media editing application 2000 includes a user interface (UI) interaction module 2015, a rendering module 2020, editing modules 2025, a media import module 2035, a color correction module 2040, and an external communication module 2045. The media editing application 2000 also includes media storage 2030. The media storage 2030 stores images (e.g., still photos, video pictures, etc.) that a user edits with the media editing application 2000. In some embodiments, the media storage 2030 is stored in one physical storage while, in other embodiments, the media storage 2030 is stored on several separate physical stores.

FIG. 20 also illustrates an operating system 2002 that includes input device driver(s) 2005 and display module 2010. In some embodiments, as illustrated, the device drivers 2005 and display module 2010 are part of the operating system 2002 even when the media editing application 2000 is an application separate from the operating system 2002.

The input device drivers 2005 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction module 2015.

The present application describes several graphical user interfaces that provide users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in a graphical user interface to control (e.g., select, move) objects in the graphical user interface. However, in some embodiments, objects in a graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2010 translates the output of a user interface for a display device. That is, the display module 2010 receives signals (e.g., from the UI interaction module 2015) describing what should be displayed and translates these signals into pixel information that is sent to the display device. The display device may be an LCD, plasma screen, CRT monitor, touchscreen, etc.

The UI interaction module 2015 of the media editing application 2000 interprets the user input data received from the input device drivers 2005 and passes it to various modules, including the editing modules 2025, the media import module 2035, and the color correction module 2040. The UI interaction module 2015 also manages the display of the UI, and outputs this display information to the display module 2010. This UI display information may be based on information from the rending module 2020, the editing module 2025, the color correction module 2040, etc. In addition, the UI interaction module 2015 may generate portions of the UI based just on user input—e.g., when a user moves an item in the UI that only affect the display, not any of the other modules, such as moving a window from one side of the UI to the other.

The color correction module 2040 is for performing various color correction edits (e.g., modification to hue, luminance, saturation, etc.) in some embodiments. The color correction module 2040 of some embodiments applies color corrections based on the positions of sliders in a color correction control (e.g., the color correction control 152). The color correction module 2040 sends color correction information (e.g., positions of sliders in the color correction control) to the external communication module 2045 for synchronization with external UI controls.

The external interface 2050 manages communication between the media editing application 2000 through the external communication module 2045 and the UI control 2090 (and other external devices in some embodiments). For instance, the external interface 2050 is responsible for transmitting data to the device 2, receiving data from the device 2, establishing connections to the device 2, and/or other typical networking functions. In some embodiments, the external interface 2050 communicates with the device 2 using any number of different communication protocols (e.g., 802.11, Bluetooth®, General Packet Radio Services (GPRS), Enhanced Data GSM Environment (EDGE), Universal Mobile Telecommunication Service (UMTS), Wideband Code-Division Multiple Access (WCDMA), transmission control protocol (TCP)/Internet protocol (IP), user datagram protocol (UDP), Ethernet, etc.). In some embodiments, the external interface 2050 is a hardware component while, in other embodiments, the external interface 2050 is a software component that is part of the operating system 2002. Still, in some embodiments, the external interface 2050 includes both a hardware component and a software component.

The external communication module 2045 manages interaction between the color correction module 2040 and the UI control 2090. In some embodiments, the external communication module 2045 handles broadcasting of services for the color correction module 2040, establishing of communication with the UI control 2090, and messaging for synchronizing the color correction module (e.g., slider positions and/or presets) with the UI control 2090.

The media import module 2035 imports media (e.g., a video clips) into the media editing application 2000 for use in creating a composite presentation. In some cases, as shown, the media import module 2035 receives the media directly from a media capturing device 2055. In other cases, the media import module 2035 imports media from an external storage 2060. The external storage 2060 may be an secure digital (SD) card, a flash drive, an external hard drive, an internal hard drive, etc.

The editing modules 2025 receive the various editing commands (trim edits, split edits, roll edits, effect edits, etc.) for editing media clips. Based on the edits to media clips, the editing modules 2025 creates and modifies data describing the affected media clips.

The rendering engine 2020 enables the storage or output of a composite media presentation using the media editing application 2000. The rendering engine 2020 receives data from the editing modules 2025 and/or the media storage 2030. The composite media presentation can be stored in the media storage 2030 storage or a different storage.

In some embodiments, the UI control 2090 is a stand-alone application or is integrated into another application. In other embodiments the UI control 2090 might be implemented within an operating system.

As illustrated in FIG. 20, the UI control 2090 includes a UI interaction module 2080 and an external communication module 2085. The UI control 2090 also includes UI control storage 2095. The UI control storage 2095 stores data (e.g., slider identifications, slider locations, presets, etc.) that the UI control 2090 uses to determine the positions of the sliders in the sliding region. In some embodiments, the UI control storage 2095 is stored in one physical storage while, in other embodiments, the media storage 2030 is stored on several separate physical stores.

FIG. 20 also illustrates an operating system 2062 that includes input device driver(s) 2065 and display module 2070. In some embodiments, as illustrated, the device drivers 2065 and display module 2070 are part of the operating system 2062 even when the UI control 2090 is an application separate from the operating system 2062.

The input device drivers 2065 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction module 2080.

The present application describes several graphical user interfaces that provide users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in a graphical user interface to control (e.g., select, move) objects in the graphical user interface. However, in some embodiments, objects in a graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 2070 translates the output of a user interface for a display device. That is, the display module 2070 receives signals (e.g., from the UI interaction module B80) describing what should be displayed and translates these signals into pixel information that is sent to the display device. The display device may be an LCD, plasma screen, CRT monitor, touchscreen, etc.

The UI interaction module 2080 of the UI control 2090 interprets the user input data received from the input device drivers 2065 and passes it to the external communication module 2085. The UI interaction module 2015 also manages the display of the UI, and outputs this display information to the display module 2070. This UI display information may be based on information from the external communication module 2090 and the input device drivers 2065. In addition, the UI interaction module 2080 may generate portions of the UI based just on user input—e.g., when a user moves an item in the UI that only affect the display, not any of the other modules, such as moving a window from one side of the UI to the other.

The external interface 2075 manages communication between the UI control 2090 through the external communication module 2085 and the media editing application 2000. For instance, the external interface 2075 is responsible for transmitting data to the device 1, receiving data from the device 1, establishing connections to the device 1, and/or other typical networking functions. In some embodiments, the external interface 2075 communicates with the device 1 using any number of different communication protocols (e.g., 802.11, Bluetooth®, General Packet Radio Services (GPRS), Enhanced Data GSM Environment (EDGE), Universal Mobile Telecommunication Service (UMTS), Wideband Code-Division Multiple Access (WCDMA), transmission control protocol (TCP)/Internet protocol (IP), user datagram protocol (UDP), Ethernet, etc.). In some embodiments, the external interface 2075 is a hardware component while, in other embodiments, the external interface 2075 is a software component that is part of the operating system 2062. Still, in some embodiments, the external interface 2075 includes both a hardware component and a software component.

The external communication module 2085 manages interaction between the UI control 2090 and the media editing application 2000. In some embodiments, the external communication module 2085 handles detecting of services for interacting with the color correction module 2040 of the media editing application 2000, establishing of communication with the media editing application 2000, and messaging for synchronizing the UI control 2090 (e.g., slider positions and/or presets) with the color correction module 2040 of the media editing application 2000.

While many of the features have been described as being performed by one module (e.g., the UI interaction module 2015, the color correction module 2040, the external communication module 2045, etc.), one of ordinary skill in the art will recognize that the functions described herein might be split up into multiple modules. Similarly, functions described as being performed by multiple different modules might be performed by a single module in some embodiments (e.g., the color correction module 2040 and the external communication module 2045).

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
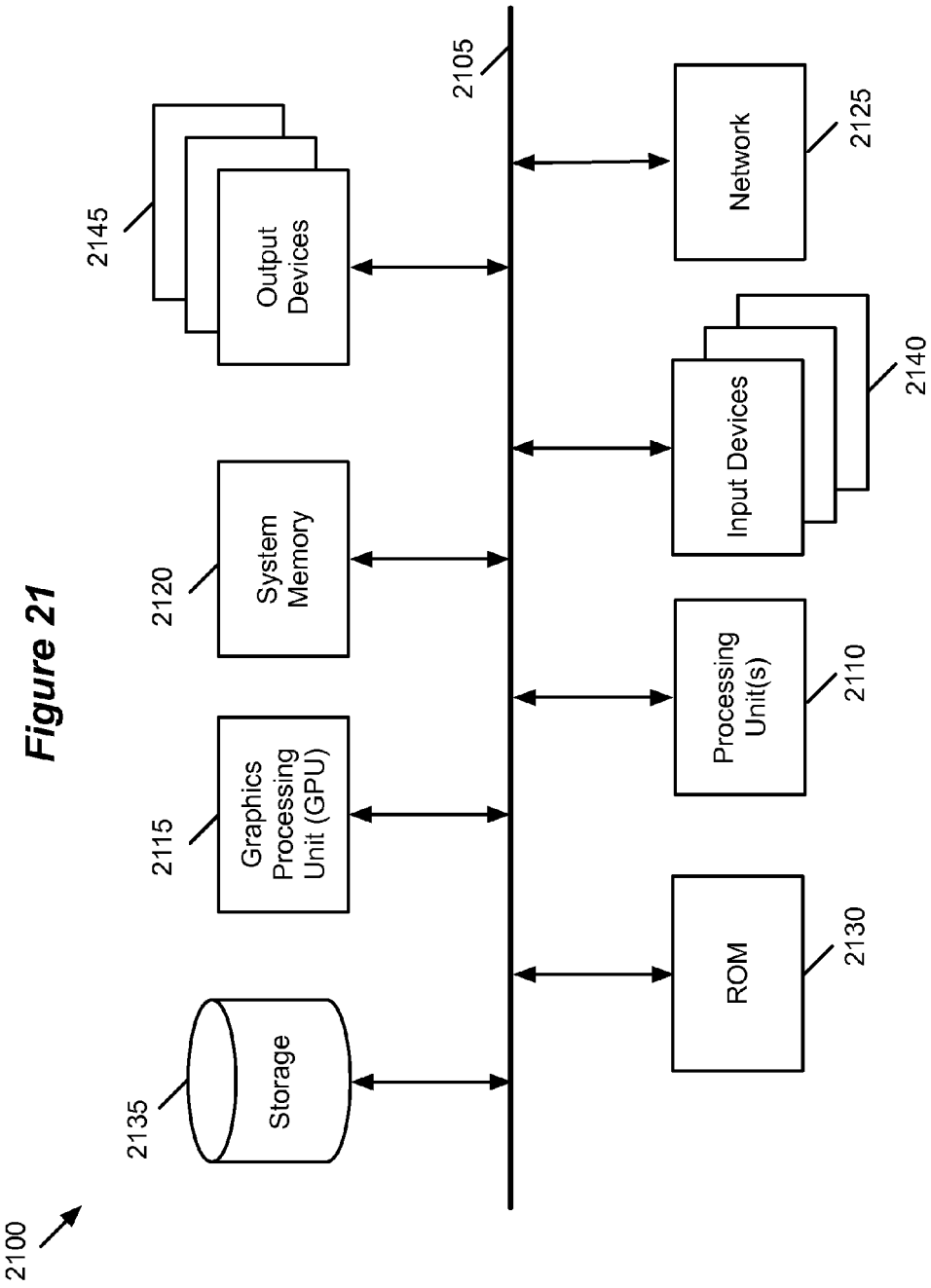
FIG. 21 conceptually illustrates an electronic device with which some embodiments of the invention are implemented.

FIG. 21 conceptually illustrates an electronic system 2100 with which some embodiments of the invention are implemented. The electronic system 2100 may be a computer, phone, PDA, or any other sort of electronic device. Such an electronic system includes various types of computer readable media and interfaces for various other types of computer readable media. Electronic system 2100 includes a bus 2105, processing unit(s) 2110, a graphics processing unit (GPU) 2115, a system memory 2120, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the GPU 2115, the system memory 2120, and the permanent storage device 2135.

From these various memory units, the processing unit(s) 2110 retrieve instructions to execute and data to process in order to execute the processes of the invention. The processing unit(s) may be a single processor or a multi-core processor in different embodiments. Some instructions are passed to and executed by the GPU 2115. The GPU 2115 can offload various computations or complement the image processing provided by the processing unit(s) 2110. In some embodiments, such functionality can be provided using CoreImage's kernel shading language.

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, or ZIP® disk, and its corresponding disk drive) as the permanent storage device. Like the permanent storage device 2135, the system memory 2120 is a read-and-write memory device. However, unlike storage device 2135, the system memory is a volatile read-and-write memory, such a random access memory. The system memory stores some of the instructions and data that the processor needs at runtime. In some embodiments, the invention's processes are stored in the system memory 2120, the permanent storage device 2135, and/or the read-only memory 2130. For example, the various memory units include instructions for processing multimedia clips in accordance with some embodiments. From these various memory units, the processing unit(s) 2110 retrieve instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2125 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 4, 7, and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A method of providing a graphical user interface (GUI) of a first device for controlling application of color corrections to a media item by a media editing application operating on a second device, the method comprising:
   providing in the GUI of the first device a display area comprising a plurality of different locations, wherein each location in the display area corresponds to a set of values; and
   providing in the GUI of the first device a plurality of controllable user interface (UI) items that are each for moving in the display area and specifying a set of values for a color correction operation that the media editing application operating on the second device applies to the media item, wherein each controllable UI item on the first device has a matching controllable UI item on the second device, wherein each movement of a controllable UI item on the first device causes a corresponding movement of the matching controllable UI item on the second device, wherein the set of values for the color correction operation specified by each controllable UI item on the first device is the set of values associated with the location at which the controllable UI item on the first device is positioned in the display area.

2. The method of claim 1 further comprising providing in the GUI of the first device a selectable UI item that, when selected, displays a set of selectable UI items that each correspond to a set of defined arrangements of the plurality of controllable UI items on the first device.

3. The method of claim 2, wherein a selection of a particular UI item in the set of selectable UI items causes each of the plurality of controllable UI items on the first device to move to a location in the display area defined by the set of defined arrangement associated with the selected particular UI item.

4. The method of claim 1 further comprising providing a selectable UI item that, when selected, defines an arrangement that specifies the current location of each controllable UI item in the plurality of controllable UI items in the display area.

5. The method of claim 1, wherein each controllable UI item in the plurality of controllable UI items on the first device is further for moving simultaneously with other controllable UI items in the display area.

6. The method of claim 1, wherein the plurality of controllable UI items on the first device are each further for moving in the display area in response to touch inputs.

7. The method of claim 1, wherein the plurality of controllable UI items on the first device are each further for moving in the display area in response to gestural inputs.

8. The method of claim 1, wherein the plurality of controllable UI items on the first device are each further for moving in the display area in response to non-gestural inputs.

9. An apparatus for controlling application of color corrections to media items by a media editing application executing on a device, the apparatus comprising:
   a set of processing units;
   a user interface (UI) module executable by at least one processing unit in the set of processing units, the UI module for displaying a plurality of controllable UI items in a display area of the apparatus and receiving input for moving the controllable UI items within the display area and specifying, for each controllable UI item, a set of values for color correction operations that the media editing application executing on the device applies to the media items, each set of values is associated with locations of the controllable UI items within the display area; and a communication module executable by at least one processing unit in the set of processing units, the communication module for generating messages specifying locations of the controllable UI items in the display area of the apparatus and transmitting the messages to the device in order for the media editing application executing on the device to adjust corresponding controllable UI items on the device and to apply color correction operations to a set of media items stored on the device based on the locations of the controllable UI items in the display area of the apparatus.

10. The apparatus of claim 9, wherein each message comprises an identification of a particular UI item and location data specifying the location of the particular UI item with respect to the display area.

11. The apparatus of claim 9, wherein the communication module is further for receiving messages from the media editing application executing on the device that specify particular color correction operations applied by the media editing application to the set of media items stored on the device, wherein the UI module is further for moving the controllable UI items within the display area of the apparatus based on the messages received from the media editing application.

12. The apparatus of claim 9, wherein the communication module is further for detecting a service broadcasted by the media editing application, the service for providing communication with the media editing application.

13. The apparatus of claim 12, wherein the communication module detects the service by using a service discovery protocol.

14. The apparatus of claim 9, wherein when the UI module receives a gestural input, the UI module moves the controllable UI items to default locations in the display area.

15. The apparatus of claim 14, wherein the gestural input is a shake input.

16. A non-transitory machine-readable medium storing a program which when executed by at least one processing unit on a first device provides a user interface (UI) control for controlling application of color corrections to media items by a media editing application executing on a second device, the program comprising sets of instructions for:
displaying a plurality of controllable UI items in a display area on the first device;
receiving input at the first device for moving at least one controllable UI item in the plurality of controllable UI items within the display area;
generating messages at the first device that specify locations of the controllable UI items in the display area; and
transmitting the messages from the first device to the second device for the media editing application to adjust corresponding controllable UI items on the second device and to apply color correction operations to a set of media items based on positions of the plurality controllable UI items in the display area.

17. The non-transitory machine-readable medium of claim 16, wherein the set of instructions for transmitting the messages from the first device to the second device comprises a set of instructions for transmitting the messages wirelessly through a network to the second device.

18. The non-transitory machine-readable medium of claim 16, wherein the first device is a tablet device.

19. A non-transitory machine-readable medium storing a computer program which when executed by at least one processing unit of a first device provides a media editing application, the computer program comprising sets of instructions for:
receiving from a second device a message specifying a color correction operation for application to a media item being edited by the media editing application based on an adjustment of a first user interface (UI) control of a plurality of UI controls provided on the second device, each UI control of the plurality of UI controls has a unique identification number, wherein the message contains the unique identification number of the first UI control;
adjusting a second UI control provided on the first device by the media editing application based on the message in order to synchronize the first and second UI controls; and
applying the color correction operation to the media item based on the adjustment of the second UI control.

20. The non-transitory machine-readable medium of claim 19, wherein the message is a first message, wherein the computer program further comprises a set of instructions for transmitting to a third device a second message specifying the color correction operation in order for the third device to synchronize a third UI control provided on the third device with the first and second UI controls.

21. The non-transitory machine-readable medium of claim 19, wherein the computer program further comprises a set of instructions for broadcasting a service for communication with the media editing application.

22. The non-transitory machine-readable medium of claim 21, wherein the computer program further comprises sets of instructions for:
receiving, through the service, a request to communicate with the second device; and
establishing with the second device a connection for communicating messages between the second device and the media editing application in order to synchronize the first UI control provided on the second device with the second UI control provided on the first device by the media editing application.

23. The non-transitory machine-readable medium of claim 22, wherein the request is a first request and the connection is a first connection, wherein the computer program further comprises sets of instructions for:
receiving, through the service, a second request to communicate with a third device; and
establishing with the third device a second connection for communicating messages between the third device and the media editing application in order to synchronize a third UI control provided on the third device with the second UI control provided on the first device by the media editing application and the first UI control provided on the second device.

24. The non-transitory machine-readable medium of claim 21, wherein the set of instructions for broadcasting the service comprises a set of instructions for broadcasting the service using a service discovery protocol.

25. The non-transitory machine-readable medium of claim 21, wherein the set of instructions for broadcasting the service comprises a set of instructions for broadcasting a hostname of the first device on which the media editing application is executing, a service name, and a service type.

26. The non-transitory machine-readable medium of claim 19, wherein the color correction operation comprises a saturation adjustment operation.

27. The non-transitory machine-readable medium of claim 19, wherein the color correction operation comprises a contrast adjustment operation.

28. The non-transitory machine-readable medium of claim 19, wherein the color correction operation comprises a hue adjustment operation.

29. A non-transitory machine-readable medium storing a computer program which when executed by at least one processing unit of a first device provides a media editing application, the computer program comprising sets of instructions for:

receiving from a second device a message specifying a first color correction operation for application to a media item being edited by the media editing application based on an adjustment of a first user interface (UI) control provided on the second device;

adjusting a second UI control provided on the first device by the media editing application based on the message in order to synchronize the first and second UI controls;

applying the first color correction operation to the media item based on the adjustment of the first UI control;

upon receiving an input directly through the second UI control, further adjusting the second UI control; and applying a second color correction operation to the media item based on the further adjustment of the second UI control.

30. The non-transitory machine-readable medium of claim 29, wherein the message is a first message, wherein the computer program further comprises sets of instructions for:

in response to the input received directly through the second UI control, generating a second message specifying the second color correction operation; and transmitting to the second device the second message in order for the second device to synchronize the first UI control provided on the second device with the second UI control provided on the first device by the media editing application.

31. The non-transitory machine-readable medium of claim 30, wherein the computer program further comprises sets of instructions for:

in response to the input received directly through the second UI control, generating a third message specifying the second color correction operation; and transmitting to a third device the third message in order for the third device to synchronize a third UI control provided on the third device with the second UI control provided on the first device by the media editing application.

32. The method of claim 1, wherein a controllable UI item of the plurality of controllable UI items on the first device moves a first distance and a matching controllable UI item on the second device moves a second distance, wherein the second distance is different than the first distance.

* * * * *